(12) United States Patent
Kojima et al.

(10) Patent No.: US 7,548,409 B2
(45) Date of Patent: Jun. 16, 2009

(54) ORGANIC ELECTROLYTE CAPACITOR USING A MESOPORE CARBON MATERIAL AS A NEGATIVE ELECTRODE

(75) Inventors: Kenji Kojima, Tokyo (JP); Satoshi Nagura, Ueda (JP); Nobuo Ando, Tokyo (JP); Yukinori Hato, Tokyo (JP); Chisato Marumo, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 200 days.

(21) Appl. No.: 10/599,383

(22) PCT Filed: Mar. 31, 2005

(86) PCT No.: PCT/JP2005/006822

§ 371 (c)(1),
(2), (4) Date: Jan. 24, 2007

(87) PCT Pub. No.: WO2005/096333

PCT Pub. Date: Oct. 13, 2005

(65) Prior Publication Data

US 2008/0165471 A1    Jul. 10, 2008

(30) Foreign Application Priority Data

Mar. 31, 2004   (JP)   .............................. 2004-108252

(51) Int. Cl.
*H01G 9/00* (2006.01)
(52) U.S. Cl. ........................ 361/503; 361/502
(58) Field of Classification Search ................... 361/502, 361/503
See application file for complete search history.

(56) References Cited

U.S. PATENT DOCUMENTS 6,461,769 B1 * 10/2002  Ando et al. ............ 429/231.95

FOREIGN PATENT DOCUMENTS

| JP | 1-44212 B2 | 9/1989 |
|----|---|---|
| JP | 3-24024 B2 | 4/1991 |
| JP | 8-102333 A | 4/1996 |
| JP | 8-107048 A | 4/1996 |
| JP | 8-162159 A | 6/1996 |
| JP | 8-255633 A | 10/1996 |
| JP | 9-55342 A | 2/1997 |

(Continued)

OTHER PUBLICATIONS

International Search Report for PCT/JP2005/006822 completed Jul. 4, 2005.

(Continued)

*Primary Examiner*—Eric Thomas
(74) *Attorney, Agent, or Firm*—Darby & Darby P.C.

(57) ABSTRACT

An organic electrolyte capacitor is provided with a high energy density, a high power and a high capacitance even at −20°. The organic electrolyte capacitor has a high discharge capacity even at a temperature as low as −20° C., while having a high voltage and a high energy density. The structure of the organic electrolyte capacitor includes a positive electrode, a negative electrode, and an electrolyte capable of transporting lithium ions. The positive electrode can reversibly support lithium ions and anions, and the negative electrode can reversibly support the lithium ions by using a mesopored carbon material having a pore volume of 0.10 ml/g or more for a pore diameter of 3 nm or larger.

10 Claims, 9 Drawing Sheets

FOREIGN PATENT DOCUMENTS

| | | |
|---|---|---|
| JP | 9-232190 A | 9/1997 |
| JP | 10-144295 A | 5/1998 |
| JP | 10-297912 A | 11/1998 |
| JP | 11-87191 A | 3/1999 |
| JP | 11-297578 A | 10/1999 |
| JP | 2001-316103 A | 11/2001 |
| JP | 2003-346801 A | 12/2003 |
| WO | WO-98/33227 A1 | 7/1998 |
| WO | WO-00/11688 A1 | 3/2000 |
| WO | WO-01/93289 A1 | 12/2001 |

OTHER PUBLICATIONS

"EVerCAP" Electric Double Layer Capacitors, CAT. 1500A, Nichikon Co., Catalog, Japan, issued Oct. 2003.

* cited by examiner

ORGANIC ELECTROLYTE CAPACITOR USING A MESOPORE CARBON MATERIAL AS A NEGATIVE ELECTRODE

CROSS-REFERENCE TO PRIOR APPLICATION

This is a U.S. National Phase Application under 35 U.S.C. §371 of International Patent Application No. PCT/JP2005/006822 filed Mar. 31, 2005, and claims the benefit of Japanese Patent Application No. 2004-108252, filed Mar. 31, 2004, both of which are incorporated by reference herein. The International Application was published in Japanese on Oct. 13, 2005 as WO 2005/096333 A1 under PCT Article 21(2).

1. Technical Field

The present invention concerns an organic electrolyte capacitor excellent in low temperature characteristics and of high energy density and power density.

2. Related Art

In recent years, secondary batteries using electroconductive polymers, transition metal oxides, etc. as a positive electrode and using lithium metal or lithium alloys as a negative electrode have been proposed as batteries instead of Ni—Cd batteries and lead batteries comprising nickel (hereinafter simply referred to as Ni) and cadmium (hereinafter simply referred to as Cd), since the energy density thereof is high. However, when charging and discharging are repeated in the secondary batteries, capacitance is lowered greatly due to the deterioration of the positive electrode or the negative electrode to leave a problem in view of practical use. Particularly, deterioration of the negative electrode is accompanied by formation of acicular lithium crystals called as dendrites and the dendrites finally penetrate a separator due to repetitive charging and discharging to bring about short-circuit inside the battery and sometimes result in problems also in view of safety such as bursting of the battery depending on the case.

In view of the above, for solving the problems, a battery using a carbon material such as graphite for a negative electrode and a lithium-containing metal oxide such as $LiCoO_2$ for a positive electrode has been proposed. The battery is a so-called locking chair type battery of supplying lithium from a lithium-containing metal oxide of the positive electrode to the negative electrode by charging after assembling the battery and, further, returning the lithium of the negative electrode to the positive electrode in discharging. Since metal lithium is not used for the negative electrode but only the lithium ions contribute to charging and discharging, this is called as a lithium ion secondary battery, which is distinguished from the lithium battery using metal lithium. The battery has a feature of having high voltage and high capacitance.

Further, under the situation where environmental problems have attracted attention, storage systems for clean energy by solar light energy generation or wind-power generation, dispersed type electric sources with an aim of averaging the load of power, or power sources for electric cars or hybrid electric cars (main power source and auxiliary power source) in place of gasoline-powered cars have been developed vigorously. Further, while lead batteries have been used so far as the power source for electric components of cars, since mounting of powered window or IT-concerned equipments have been improved recently, new power sources of high energy density and high output density have now been demanded also for such application uses.

For such electric storage devices or driving power sources, the lithium ion secondary batteries or electric double layer capacitors have attracted attention. However, while lithium ion batteries have high energy density, they still involve problems in view of the power characteristics, safety and cycle life. Particularly, charging and discharging at a temperature as low as −20° C. results in critical subjects such as decrease of the capacitance to one-half or less and electro crystallization of lithium metal during charging to bring about deterioration of the cell.

On the other hand, the electric double layer capacitor is an electronic part used generally as a memory-back up power source for IC and LSI, and it has high power characteristics and maintenance free performance not found in the lithium ion battery or nickel hydrogen battery in that it is excellent in the instantaneous charge/discharge characteristics and can endure charging and discharging for several tens thousand cycles although the discharging capacity per one charging cycle is smaller compared with the battery. Also, the internal resistance does not increase so much even at a low temperature of −20° C., the capacitance retention is high as 80% or higher and it can be used in a wide temperature range (refer, for example, to Non-Patent Document 1).

Recently, use of mesopored carbon as the activated carbon for the positive electrode and the negative electrode has been studied actively and it has attracted attention in that high capacitance and high power can be obtained. Further, while the carbon is not particularly restricted in view of the manufacturing method and the starting material, they are disclosed in respective publications (refer, for example, Patent Documents 1 and 2).

However, while the electric double layer capacitors have such advantages, since the energy density of general double layer capacitors is about 3 to 4 Wh/l which is lower by about two digits compared with that of lithium ion batteries, they have not yet reached a practical level at present as a driving power source requiring high energy density such as in the application use of electric cars. When considering the application use in the electric cars, it is said that an energy density of from 6 to 10 Wh/l for practical use or 20 Wh/l for popularized use is necessary.

Electric storage devices coping with the application use requiring such high energy density and high power characteristics, electric storage devices referred to as hybrid capacitors have attracted attention in recent years. In the present application, those capacitors using organic solvent solutions as electrolytes in all capacitors including electric double layer capacitors and hybrid capacitors are collectively referred to as organic electrolyte capacitors. The electrode includes a non-polarizing electrode accompanying movement of charges at the electrode-electrolyte boundary (Faradaic reaction) and a polarizing electrode (not accompanying movement of charges) (non-Faradaic reaction).

Generally, a battery has a structure of using a non-polarizing electrode for both electrodes and the electric double layer capacitor has a structure using a polarizing electrode for both electrodes. Those referred to as hybrid capacitors have a structure of using a polarizing electrode for one electrode and using a non-polarizing electrode for another electrode. They have been developed actively as electric storage devices having both high energy density of battery and high power characteristics of the electric double layer capacitor.

In relation with the hybrid capacitor, it has been proposed an organic electrolyte capacitor of using, as the negative electrode, a carbon material formed by preliminarily absorbing lithium ions to a carbon material capable of absorbing and desorbing lithium ions (hereinafter referred to simply as $Li^+$) by a chemical method or an electrochemical method (for example, refer to Patent Document 3). Further, it has been proposed an organic electrolyte capacitor of supporting lithium to a carbon material capable of absorbing and desorbing lithium ions on a porous current collector not forming an alloy with a lithium metal (hereinafter referred to simply as Li) and having an upper limit voltage of 4 V of the negative electrode (refer, for example, to Patent Document 4).

Further, it has been proposed an organic electrolyte capacitor using a polarizing electrode material containing an activated carbon powder combined with a current collector of stainless steel fibers in a mixed state as a positive electrode, and a carbon material formed by preliminarily absorbing lithium ions by a chemical method or an electrochemical method to a carbon material capable of absorbing and desorbing the lithium ions combined with a current collector of a porous metal or fibrous metal as the negative electrode (refer, for example, to Patent Document 5).

Further, it has been proposed an organic electrolyte capacitor in which the positive electrode is a polarizing electrode comprising a carbonaceous substance having a spontaneous potential of the positive electrode of 0.5 V or higher and 2.6 V or lower with $Li/Li^+$ being as a counter electrode, and the negative electrode comprises at least one substance selected from metal lithium, lithium-containing alloys, and substances formed by preliminarily absorbing lithium ions to a substance capable of reversibly absorbing and desorbing lithium ions (refer, for example, to Patent Document 6).

While lithium ions are preliminarily supported on the negative electrode thereby lowering the negative electrode potential and increasing the cell withstanding voltage in the disposals described above, they are of a cell structure in which a pair of positive electrode and negative electrode are opposed as in a coin battery but different from cylindrical batteries formed by winding electrodes or square batteries formed by stacking a plurality of electrodes.

Further, a method of preliminarily supporting lithium ions in large-scaled cells has also been disclosed. However, each of them leaves a problem in view of industrialization such as requiring much times for supporting and in view of uniformity (refer, for example, to Patent Documents 7 to 10).

On the other hand, it has been proposed an organic electrolyte battery in which a positive electrode current collector and a negative electrode current collector each has holes penetrating from the surface to the rearface, the negative electrode active material can reversibly support lithium ions, and lithium derived from the negative electrode is supported by electrochemical contact with lithium metal disposed being opposed to the negative electrode or the positive electrode (refer, for example, to Patent Document 11).

In this document, since holes penetrating from the surface to the rearface are formed to the electrode current collectors and, accordingly, lithium ions can move between the surface and the rearface of the electrodes without being interrupted by the electrode current collectors, lithium ions can be supported electrochemically not only on the negative electrode disposed near the lithium metal but also on the negative electrode disposed apart from the lithium metal by way of the through holes, also in an electric storage device of a cell structure having a large number of lamination layers.

As the negative electrode active material, various materials have been used so long as they can reversibly support the lithium ions, and it has been known to use, for example, graphite such as natural graphite and artificial graphite, various carbon materials using coke, pitch, thermosetting resin, coconut shell, timber, etc. as the starting material, carbon fibers, polyacene substances, tin oxides, and silicon oxides, etc.

As the negative active material, heat treated products of aromatic condensed polymers, which are insoluble and infusible substrates having a polyacene skeleton structure with the atom ratio of hydrogen atom/carbon atom is from 0.50 to 0.05 have been used. The insoluble and infusible substrate can be obtained by heat treating the aromatic polymer described above and, for example, an insoluble and infusible substance having the polyacene skeleton structure can be used suitably (refer, for example, to Patent Documents 12 and 13).

However, the hybrid capacitor uses a electrolytic solution comprising an electrolyte capable of transporting lithium ions, and it has a critical subject that the resistance is high at low temperature like the lithium ion secondary battery and no sufficient capacity is obtained. For the improvement of the low temperature characteristics, methods of surface treatment such as high temperature treatment of the negative electrode carbon material to enhance the polarity on the surface and improve the compatibility with the electrolyte, improvement by the surface coat formation by the additives to the electrolyte, or control of the solvation to lithium ions have been reported but they have not yet reached a practical level.

Non-Patent Document 1: Nichikon Co., Catalog, Japan, issued October, 2003.

Patent Document 1: PCT/JP99/04541 (Claims, claim 1 to claim 12).

Patent Document 2: PCT/JP00/08575 (Claims, claim 1 to claim 4).

Patent Document 3: JP-A No. 8-107048 (page 2, column 2, line 38 to page 2, column 2, line 47).

Patent Document 4: JP-A No. 9-55342 (page 7, column 11, line 24 to page 7, column 11, line 28).

Patent Document 5: JP-A No. 9-232190 (page 4, column 6, line 1 to page 4, column 6, line 10).

Patent Document 6: JP-A No. 11-297578 (page 3, column 4, line 8 to page 3, column 4, line 16).

Patent Document 7: JP-A No. 8-162159 (page 4, column 6, line 10 to page 4, column 6, line 45).

Patent Document 8: JP-A No. 8-255633 (page 4, column 5, line 33 to page 5, column 7, line 29).

Patent Document 9: JP-A No. 10-144295 (page 2, column 2, line 4 to page 2, column 2, line 34).

Patent Document 10: JP-A No. 8-102333 (page 3, column 3, line 2 to page 3, column 3, line 37).

Patent Document 11: WO98/033227 (page 11, line 4 to page 12, line 27)

Patent Document 12: JP-B No. 1-44212 (Scope of the claim for Patent, claim 1 to claim 22).

Patent Document 13: JP-B No. 3-24024 (Scope of the claim for Patent, claim 1 to claim 8).

DISCLOSURE OF THE INVENTION

As described above, in a negative electrode in which lithium ions are preliminarily absorbed to a carbon material, etc. capable of absorbing and desorbing lithium ions, since the potential becomes less noble than that of the activated carbon used for an electric double layer capacitor, the withstanding voltage of the cell combined with the positive electrode activated carbon is improved and, further, since the capacitance of the negative electrode is extremely large compared with that of the activated carbon, the energy density is increased.

However, discharge at a high current density was difficult due to problems, for example that the electrolyte containing lithium ions has low electroconductivity and that absorbing and desorbing reaction of lithium ions at the negative electrode is slow. Particularly, at a low temperature of −20° C., no large capacity was not obtained in the organic electrolyte capacitor using an electrolyte containing lithium ions.

Accordingly, it is an object of the present invention to provide an organic electrolyte capacitor having a high capacitance also at −20° C. and having high energy density and high power.

As a result of an earnest study for solving the subject described above, the present inventors have found that resistance is low and high capacitance can be obtained even at low temperature by using a mesopored carbon material having a pore volume of 0.10 ml/g or more for pore diameter of 3 nm or greater as the negative electrode active material of an organic electrolyte capacitor, and have accomplished the present invention.

That is, the present invention is as described below.

[1] An organic electrolyte capacitor comprising: a positive electrode, a negative electrode and an electrolyte capable of transporting lithium ions, wherein the negative electrode active material is a mesopored carbon material which a pore volume of pore diameter is 3 nm or larger having 0.10 ml/g or more.

[2] The organic electrolyte capacitor according to [1] above, wherein the mesopored carbon material is one or a mixture of plurality of members selected from activated carbon, coconut shell char, coke, charcoal, bamboo char and resinous carbide.

[3] The organic electrolyte capacitor according to [2] above, wherein the resinous carbide is a phenol resin carbide, or the resin is a phenol resin.

[4] The organic electrolyte capacitor according to any one of [1] to [3], wherein the mesopored carbon material is prepared by using Ni or Ni compound.

[5] The organic electrolyte capacitor according to any one of [1] to [4], wherein lithium ions are preliminary supported on the negative electrode and/or positive electrode so that the positive electrode potential is 2.0 V ($Li/Li^+$) or less, when the positive electrode and the negative electrode are short-circuited.

[6] The organic electrolyte capacitor according to [5], wherein the organic electrolyte capacitor includes a positive electrode current collector and a negative electrode current collector, each of the current collectors has holes penetrating from surface to rearface, and lithium ions are supported by being supplied from lithium opposed to the negative electrode and/or the positive electrode electrochemically to the negative electrode and/or the positive electrode.

In the mesopored carbon material, the negative electrode active material has the pore volume of 0.10 ml/g or more for pore diameter of 3 nm or greater, because it is necessary that the pore volume is 0.10 ml/g or more for pore diameter of 3 nm or greater in order to sufficiently improve the easy moving of the solvated lithium ions. While the upper limit of the pore volume for pore diameter of 3 nm or greater is not particularly restricted, the pore volume is about 0.54 ml/g in a case of an activated carbon which is activated with alkali of 3100 $m^2/g$ which is considered to have the mesopores at the maximum extent, among the activated carbon produced by usual processes.

As has been described above, the organic electrolyte capacitor according to the present invention is an organic electrolyte capacitor having a positive electrode, a negative electrode, and an electrolyte capable of transporting lithium ions, in which the positive electrode can reversibly support lithium ions and anions and the negative electrode can reversibly support the lithium ions and, by using the mesopored carbon material having the pore volume of 0.10 ml/g or more for pore diameter of 3 nm or greater as the negative electrode active material, an organic electrolyte capacitor having a high discharge capacitance even at a low temperature state as low as −20° C. while having a high voltage and a high energy density is attained.

The organic electrolyte capacitor according to the present invention having such a feature is extremely effective as an electric storage power source or an auxiliary electric storage power source for driving electric cars, hybrid electric cars, fuel cell cars, etc. Further, it is also used suitably, for example, as an electric storage source or an auxiliary electric storage source for driving electromotive bicycles, electromotive scooters, electromotive invalid wheel chairs, etc. Further, such capacitor can be used suitably also as a storage device for various kinds of energies such as an electric storage device for solar energy or an electric storage device for wind-generated power, or as an electric storage source for a permanent power supply device or a household electric appliance.

BRIEF DESCRIPTION OF THE DRAWINGS

FIG. 5 is an example of using an expanded metal as an electrode current collector in which a portion surrounded with a dotted line shows a through hole.

As shown in FIG. 6, through holes in the expanded metal (positive electrode current collector 1a, negative electrode current collector 2a) are clogged with conductive materials 1b, 2b, and the positive electrode 1 and the negative electrode 2 are formed on the conductive layer over the expanded metal which clogged the through holes.

DESCRIPTION OF REFERENCES

Figure 1:
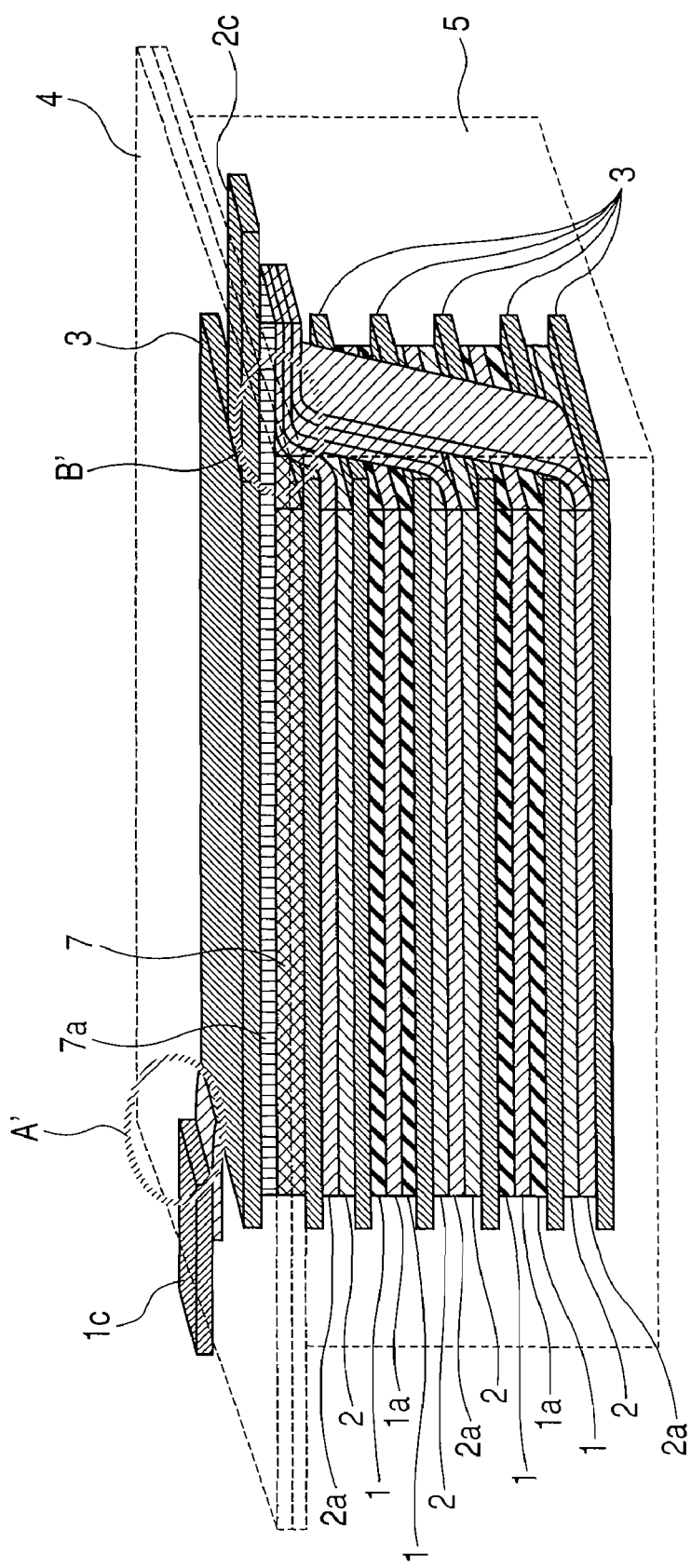
FIG. 1 is a perspective view showing the internal structure of an organic electrolyte capacitor in a case of using a laminate film as an external casing. The internal structure of the organic electrolyte capacitor is depicted by a solid line, while the external casing of the organic electrolyte capacitor is depicted by a broken line.

1 positive electrode
1a positive electrode current collector
1c positive electrode terminal 2 negative electrode
2a negative electrode current collector
2c negative electrode terminal
3 separator
4,5 laminate film
6 electrode lamination unit
7 lithium
7a lithium electrode current collector
8 three electrode lamination unit
A, B, C heat-seal portion
A' terminal connection portion
B' terminal weld portion

BEST MODE CARRYING OUT THE INVENTION

An organic electrolyte capacitor according to the present invention is an organic electrolyte capacitor having a positive electrode, a negative electrode, and an electrolyte capable of transporting lithium ions, which is an organic electrolyte capacitor wherein the positive electrode can reversibly support the lithium ions and anions and the negative electrode comprises a mesopored carbon material having a pore volume of 0.10 ml/g or more for pore diameter of 3 nm or greater.

In the present invention, lithium ions are preferably supported preliminarily on the negative electrode and/or positive electrode such that the positive electrode potential is 2.0 V (Li/Li$^+$) or less when the positive electrode and the negative electrode are short circuited. Further, for supporting lithium, by using a positive electrode current collector and a negative electrode current corrector having holes penetrating from the surface to the rearface, lithium disposed being opposed to the negative electrode and/or positive electrode can be supplied electrochemically to the negative electrode and/or the positive electrode, which is most suitable industrially.

Figure 2:
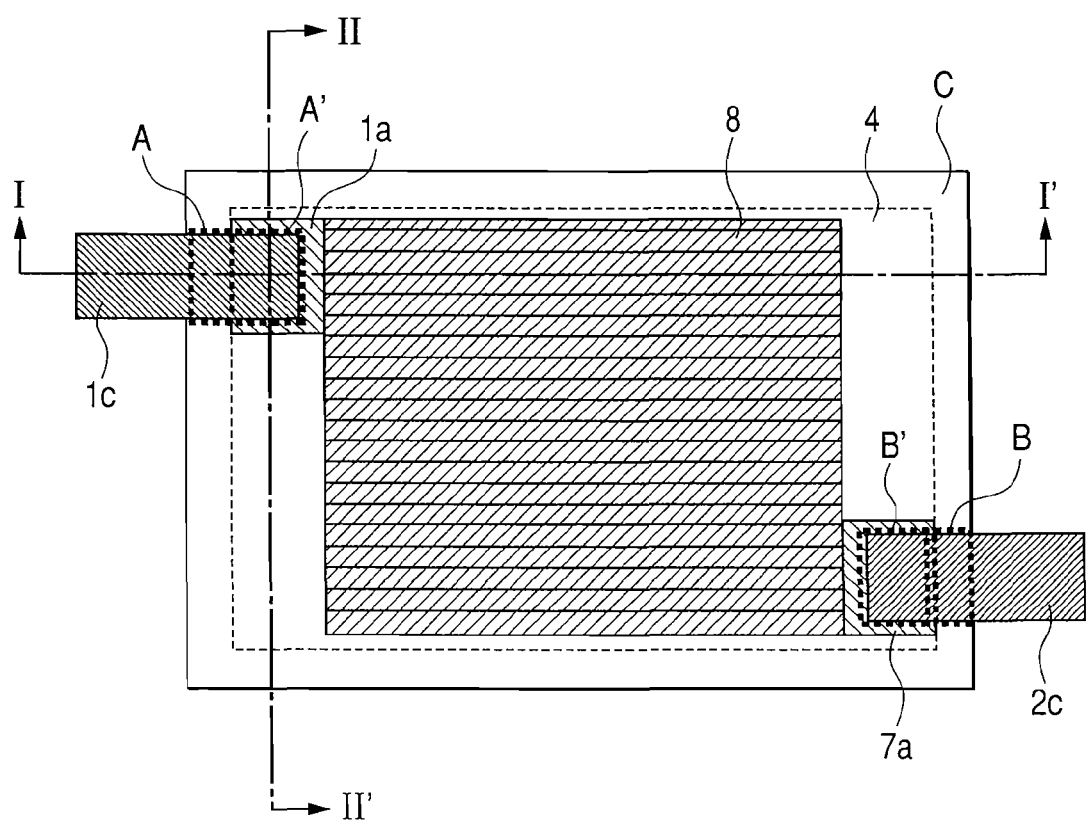
FIG. 2 is a plan view of FIG. 1.
Figure 3:
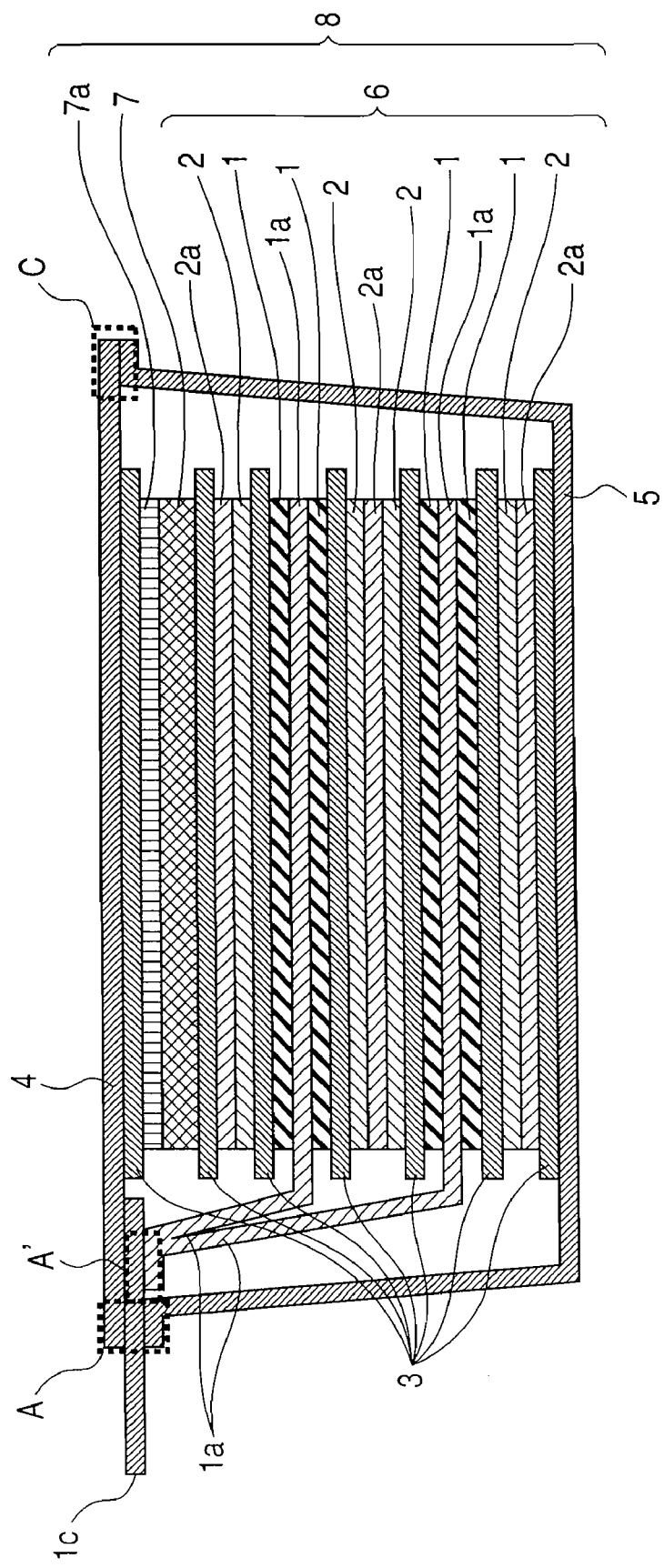
FIG. 3 is a cross sectional view along I-I' of FIG. 2.
Figure 4:
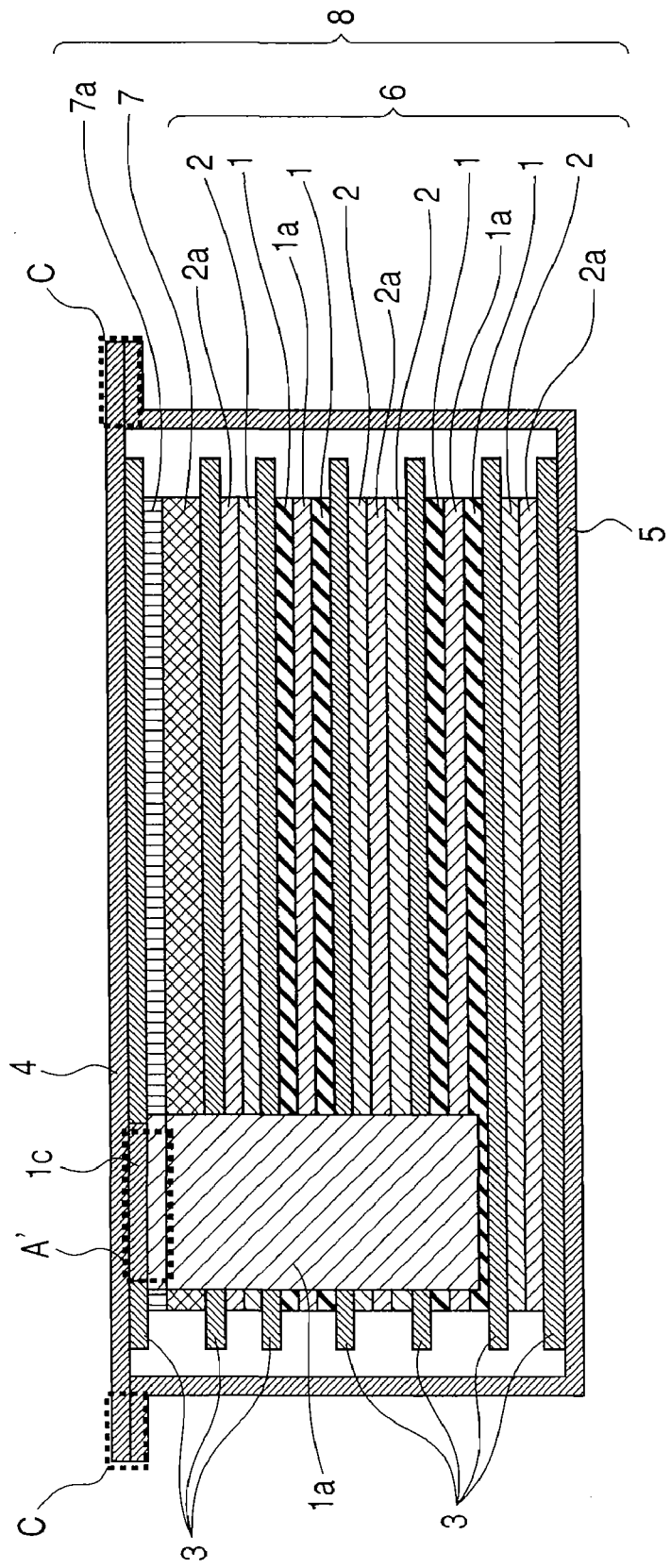
FIG. 4 is a cross sectional view along II-II' of FIG. 2.

At first, the internal structure of the organic electrolyte capacitor of the present invention is to be described. FIG. 1 is shown as an example in a case of using a laminate film as an external casing in which an example of an internal structure of the organic electrolyte capacitor of the present invention is shown as a perspective view. In FIG. 1, the internal structure of the organic electrolyte capacitor is shown by a solid line, while an external casing of the organic electrolyte capacitor is shown by a broken line. FIG. 2 is a plan view of FIG. 1, FIG. 3 is a cross sectional view along I-I' of FIG. 2, and FIG. 4 is a cross sectional view along II-II' in FIG. 2.

An organic electrolyte capacitor according to the present invention shown in FIG. 1 has a structure in which a three electrode lamination unit formed by laminating a positive electrode 1, a negative electrode 2, a lithium electrode 7, and a separator 3 is disposed inside the cell, and, after injecting an electrolyte capable of transporting lithium ions, two laminate films 4, 5 are heat-sealed, etc. In the present invention, "positive electrode" means an electrode on the side where current flows out upon discharging and current flows in upon charging, while "negative electrode" means an electrode on the side where current flows in upon discharging and the current flows out upon charging.

As shown in FIG. 1, the positive electrode 1 formed on the positive electrode current collector 1a and the negative electrode 2 formed on the negative electrode current collector 2a are laminated by way of the separator 3 such that they are not in direct contact with each other, to form an electrode lamination unit 6. Above the electrode lamination unit 6, a lithium electrode 7 formed by pressure bonding lithium metal on one surface of a lithium electrode current collector 7a is disposed by way of the separator 3, to form three-electrode lamination unit.

As an example of the present invention, each of the electrode current collectors (positive electrode current collector 1a, negative electrode current collector 2a) and the lithium electrode current collector 7a has holes penetrating from the surface to the rearface (not illustrated in FIG. 1) and, even when the through holes are clogged with the conductive material, lithium ions can freely move between each of the electrodes passing through the through hole portion in a state clogged with the conductive material.

Figure 5:
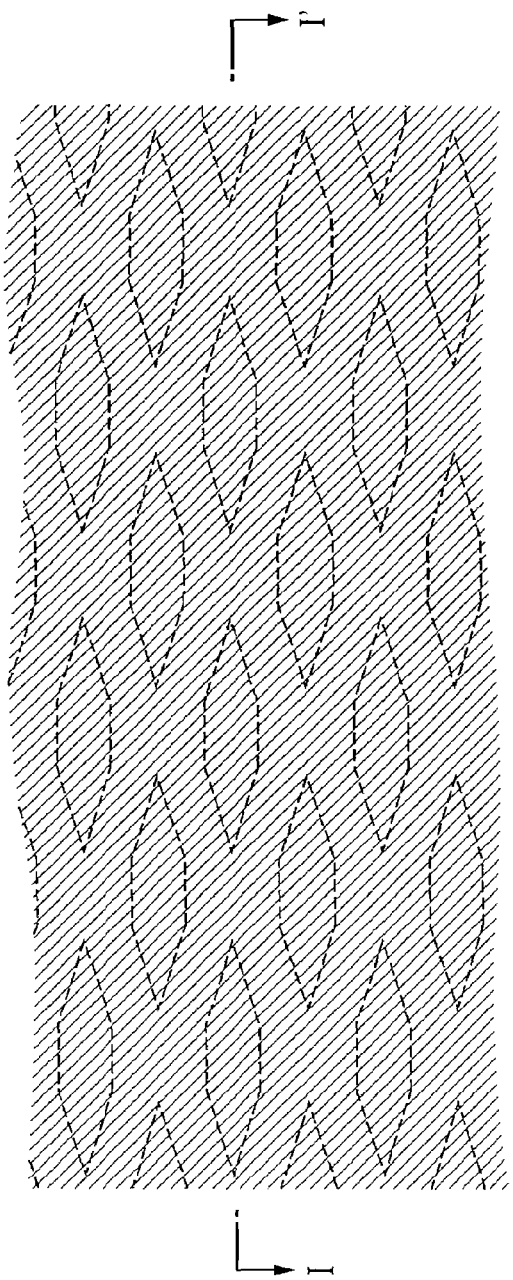
FIG. 5 shows an enlarged plan view of an electrode current collector (positive current collector 1a, negative current collector 2a) formed with an electrode.
Figure 6:
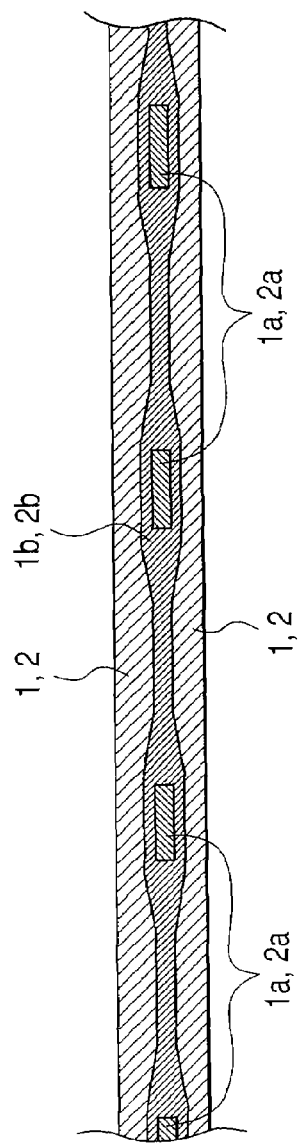
FIG. 6 shows a cross sectional view along I-I' of FIG. 5.
Figure 7A:
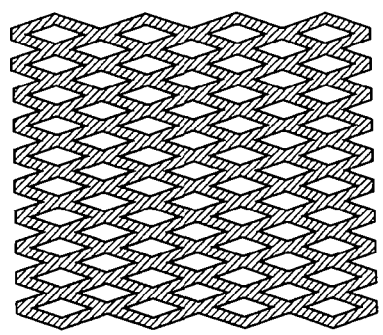
FIG. 7(a) shows an example of an expanded metal with 38% porosity.
Figure 7B:
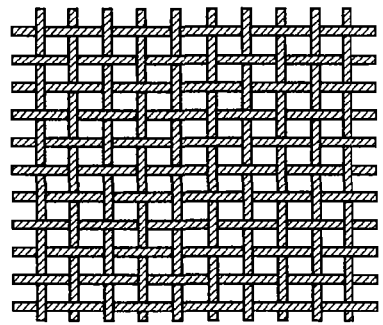
FIG. 7(b) shows a metal mesh with 37% porosity.
Figure 7C:
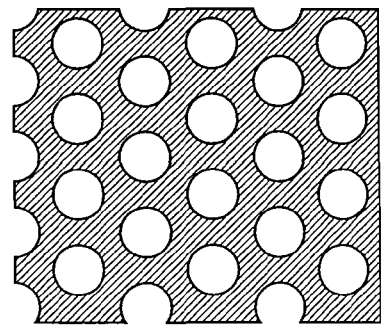
FIG. 7(c) shows an example of punched metal of 34% porosity. In the example of FIG. 7(c), while the through hole in the electrode current collector is circular, the shape of the through hole is not restricted thereto but may be set properly such as, for example, a square shape (45% porosity) shown in FIG. 7(d), or a cross-like shape (35% porosity) as shown in FIG. 7(e).
Figure 7D:
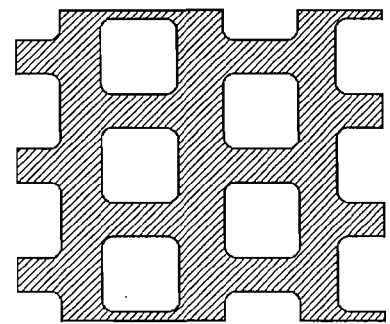
FIG. 7 shows examples of the electrode current collector.
Figure 7E:
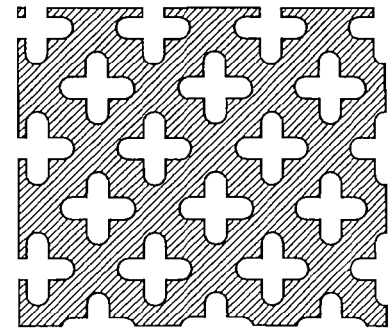

FIG. 5 shows an enlarged plan view of the electrode current collector (positive electrode current collector 1a, negative electrode current collector 2a) each formed with the electrode. FIG. 5 is an example of using an expanded metal as the electrode current collector in which a portion surrounded with a dotted line shows a through hole. FIG. 6 shows a cross sectional view along I-I' in FIG. 5. As shown in FIG. 6, through holes of the expanded metal (positive electrode current collector 1a, negative electrode current collector 2a) are clogged with the conductive materials 1b, 2b, and the positive electrode 1 and the negative electrode 2 are formed on the conductive layer over the expended metal which is clogged the through holes.

Upon assembling the cell, when an electrolyte is injected, entire negative electrode 2 and lithium electrode 7 are in contact electrochemically with each other and the lithium ions leached from the lithium electrode 7 into the liquid electrolyte are supported smoothly on all the negative electrodes 2 by way of the through holes in the lithium electrode current collector 7a, the positive electrode current collector 1a and the negative electrode current collector 2a.

In FIG. 3, while the electrode lamination unit 6 has positive electrodes 1 and the negative electrodes 2 each of four layers, the structure of the electrode lamination unit is not particularly restricted and the number of layers for the positive electrode and the negative electrode is not particularly restricted so long as the positive electrode or the negative electrode has at least one layer.

While the lithium electrode 7 is disposed above the electrode lamination unit 6 to form a three electrode lamination unit 8, the position, the number of layers, and the shape of the lithium electrode 7 are not restricted thereto. However, for supporting lithium smoothly, the lithium electrode 7 is preferably disposed being opposed to the negative electrode or the positive electrode. For example, the lithium electrode 7 may be directly bonded on the negative electrode 2. In a case of directly bonding the lithium electrode 7 on the negative electrode 2, while lithium is supported directly on the adjacent negative electrode, lithium is supported on other not adjacent negative electrodes while penetrating at least one layer of electrodes.

The lithium electrode 7 is disposed for supplying lithium ions to the negative electrode 2. Accordingly, an amount capable of obtaining an aimed capacitance of the negative electrode may suffice. Further, while the effect of supplying the lithium ions also can be obtained by supplying not only to the negative electrode but also to the positive electrode or to both of the positive electrode and the negative electrode, the amount is preferably controlled properly while considering the lithium absorbing performance of the positive electrode and the negative electrode, stability, etc.

The lithium electrode 7 is gradually consumed by releasing lithium ions. Accordingly, it is preferred that a conductive porous member such as a stainless steel mesh is used as the lithium electrode current collector 7a and at least a portion of the lithium electrode 7 is filled and arranged in the pore portion of the lithium electrode current collector. Thus, even when lithium is supported from the lithium electrode 7 to the electrode, a gap formed between the electrodes due to the disappearance of lithium is decreased to support lithium smoothly on the electrode active material.

In the organic electrolyte capacitor of the present invention shown in FIG. 1, the separator 3 is disposed between each of the electrodes such that the positive electrode 1, the negative electrode 2, and the lithium electrode 7 are not in direct contact with each other. An electrolyte capable of transporting the lithium ions is filled inside the cell, and the electrolyte is also impregnated in the separator for separating each of the electrodes. The electrolyte is usually dissolved in a solvent and used in a liquid state and it is also impregnated into the separator 3. In a case of not using the separator 3, etc., the electrolyte may be also used in a gel or solid form in order to prevent liquid leakage of the electrolyte and prevent direct contact of the positive electrode 1 and the negative electrode 2 respectively.

As shown in FIG. 2, each of the positive electrode current collectors 1a has a lead as a terminal connection portion A', and the terminal weld portion A' (two sheets) for each of the positive electrode current collectors 1a and the positive electrode terminal 1c are welded. Further, each of the negative electrode current collectors 2a and the lithium current collectors 7a has a lead as a terminal connection portion B', and the terminal weld portions B' (three sheets) for each of the negative electrode current collectors 2a and the terminal weld portion B' (one sheet) of the lithium electrode current collector 7a are bundled and welded to the negative electrode terminal 2c.

The laminate films 4 and 5 are sealed in a state of sandwiching the positive electrode terminal 1c and the negative electrode 2c, and the positive terminal 1c and the negative electrode terminal 2c are heat-sealed to the laminate films 4, 5 respectively at the heat-sealed portions A, B shown in FIG. 2. That is, in the example of FIG. 2, the organic electrolyte capacitor is sealed at the heat-sealed portions A, B for the laminate films 4, 5 and each of the terminals, and at the heat-sealed portion C for the laminate films 4 and 5. Accordingly, the positive electrode terminal 1c and the negative electrode terminal 2c are led to the outside of the cell from a portion between the laminate films 4 and 5, in which the positive electrode 1 can be connected through the positive electrode terminal 1c and the negative electrode 2 and the lithium electrode 7 can be connected through the negative terminal 2c to an external circuit, respectively.

While the shape and the size of the positive electrode terminal 1c and the negative electrode terminal 2c are not particularly restricted, it is preferably thick and wide as much as possible within a range capable of providing a sufficient air tightness within a limited cell volume since the resistance of the terminal is lowered. The shape and the size for each of the terminals are preferably set properly in accordance with the aimed characteristics of the cell.

The organic electrolyte capacitor according to the present invention is to be described specifically in the order of:

[A] positive electrode current collector and the negative electrode current collector, [B] mesopored carbon material, [C] negative electrode, [D] positive electrode, [E] lithium, [F] electrolyte, [G] external casing, [H] principle for organic electrolyte capacitor, [I] manufacturing method of an organic electrolyte capacitor, and [J] method of measuring the pore volume and the specific surface area of pore size of 3 nm or greater.

[A] Positive Electrode Current Collector and Negative Electrode Current Collector For the positive electrode current collector and the negative electrode current collector, various materials proposed in the application use such as organic electrolyte batteries can be used generally. Aluminum, stainless steel, etc. can be used for the positive electrode current collector, and stainless steel, copper, nickel, etc. can be used for the negative electrode current collector respectively, and those of various shapes such as foils or nets can be used. Particularly, for preliminarily supporting lithium on the negative electrode and/or positive electrode, those having holes penetrating from the surface to the rearface are preferred and they include, for example, expanded metal, punched metal, metal mesh, foamed material or porous foils provide with through holes by etching, etc. Further, formation of a conductive layer on the current collector is preferred since this can decrease the internal resistance.

More preferably, before forming the electrode, by clogged at least a portion of the through holes in the electrode current collector by using a less detaching conductive material, the productivity for the electrode is improved, as well as the problem of lowering the reliability of the capacitor by the detaching of the electrode can be solved and, further, the thickness of the electrode including the current collector is reduced to attain high energy density and high power density.

The form, the number, etc. of the through holes in the electrode current collector can be properly determined such that the lithium ions in the electrolyte to be described later can move between the surface and the rearface of the electrode with no interruption by the electrode current collector, and they can be clogged easily with the conductive material.

The porosity of the electrode current collector is defined as obtainable by converting the ratio: {1-(current collector weight/current collector true specific gravity)/(current collector bulk volume)} to percentage. The porosity of the electrode current collector used in the present invention is, usually from 10 to 79% and, preferably, from 20 to 60%.

In a case where the porosity of the electrode current collector is high, the time required for supporting lithium on the negative electrode is short and unevenness for the support of lithium less occurs but the strength of the current collector is lowered tending to cause wrinkles or disconnection. Further, this makes it difficult to retain the conductive material or the active material in the through hole to result in problems such as lowering of the yield in the electrode manufacture due to detaching, disconnection, etc. of the electrode.

On the other hand, in a case where the porosity is low, the time required for supporting lithium on the negative electrode is longer to result in problems such as lowering of the production efficiency and increase of the variations in the cell characteristics but the strength of the current collector is improved and the active material less detaches, so that the electrode yield is improved. The porosity or the pore diameter of the electrode current collector is desirably selected properly within the range described above while considering the structure (lamination type or wound type, etc.) and the productivity for the structure of the cell.

FIG. 7 shows examples of an electrode current collector. FIG. 7(a) shows an example of an expanded metal with 38% porosity, FIG. 7(b) shows an example of a metal mesh with 37% porosity and FIG. 7(c) shows an example of a punched metal with 34% porosity. In the example of FIG. 7(c), while the through hole of the electrode current collector is circular, the shape of the through hole is not restricted thereto but it can be set properly such as a square shape (45% porosity) shown in FIG. 7(d) or a cross shape (35% porosity) shown in FIG. 7(e).

[B] Mesopored Carbon Materials

Generally, for the pores in the porous member, pores having less than 0.8 nm pore diameter are referred to as sub-micron pores, pores having a pore diameter in a range from 0.8 to 2 nm are referred to as micropores, and pores having a pore diameter from 2 to 50 nm are referred to as mesopores, and pores having a pore diameter of 50 nm or more are referred to as macro pores.

According to the existent manufacturing method for the activated carbon activated carbon is produced in which sub-micron pores having a pore diameter of less than 0.8 nm and micropores having a pore diameter of 0.8 to 2 nm are mainly developed. However, mesopores having the pore diameter of from 2 to 50 nm are less formed and the ratio of the mesopore pore volume is less than 10% of the entire portion. Such usual activated carbon is excellent in the absorbability of molecules with small molecule size but it is often difficult to increase the moving speed of inorganic compound or organic compound used as an electrolyte or electrolytic solution of the organic electrolyte capacitor, and the assembly of a greater size by salvation thereof.

On the other hand, activated carbon produced by using a chemical activation method, special material or method, with the large pore volume both in the micropore to mesopore regions for pore diameter of 50 nm or less and having a large specific surface area is used preferably as the active material for the organic electrolyte capacitor.

On the other hand, in the present invention, it has been found that the pore volume of 0.10 ml/g or more for pore diameter of 3 nm or larger is necessary in the carbon material used for the negative electrode for sufficiently increasing the easy moving of the solvated lithium ions, and mesopored rich carbon material is referred to as mesopored carbon material irrespective of the specific surface area, that is, the content of the micropores.

The negative electrode active material in the present invention is defined to have 0.10 ml/g or more of pore volume for pore diameter of 3 nm or larger and the upper limit for pore diameter is not particularly restricted, but it is usually within a range from 3 to 50 nm. While also the range of the pore volume is not particularly restricted, it is, usually, about from 0.1 to 0.5 ml/g and, preferably, about from 0.15 to 0.5 ml/g.

The manufacturing method of the mesopored carbon material includes a method of applying a heat treatment at high temperature while adding Ni or Ni compound to a carbon material precursor, which can form mesopores relatively easily even from a material difficult to be activated and which is an excellent manufacturing method.

The Ni compound used herein is not particularly restricted and, nickel chloride, nickel nitrate, nickel sulfate, and hydration products thereof, etc. can be used preferably.

The kind of the carbon material is not particularly restricted so long as the material can reversibly support lithium ions and, for example, graphite such as natural graphite and artificial graphite, various kinds of carbon materials using coke, pitch, thermosetting resin, coconut shell, timber, etc. as the starting material, carbon fibers, polyacene substances, tin oxides, and silicon oxides, etc. can be used. Among them, activated carbon, coconut shell, coke, charcoal, bamboo coal, resin carbonization product and mixtures thereof are preferred since they can be easily provided with mesopores. Further, in a case where the resin carbonization product is a phenol resin carbonization product, it is more preferred since the content of impurity is small and the stability of the performance is high.

For the carbon material precursor, coke, pitch, resin such as phenol and melamine, plant materials such as coconut shell or saw dust can be used.

The heat treatment method upon preparing the mesopored carbon material is not particularly restricted and, for example, it is preferred to conduct the heat treatment and activation, for example, in a non-oxidative atmosphere under nitrogen gas stream, or in combination with steams or an oxidative gas such as $CO_2$ at about 800 to 1000° C.

The temperature elevation rate and the retention time at the highest temperature are not particularly restricted so long as the condition is matched to provide predetermined pore volume and it is usually preferred to conduct heat treatment or activation for about 1 to 10 hours while elevation to the highest temperature at 50 to 100° C./hr.

As the apparatus for conducting the heat treatment or activation, stationary electric furnace, cylindrical furnace, batch-wise or continuous rotary kiln, etc. can be used.

[C] Negative Electrode

In the organic electrolyte capacitor of the present invention, the negative electrode active material uses the mesopored carbon material as described above, which can reversibly support lithium ions and has mesopores having pore volume of 0.10 ml/g or more for pore diameter of 3 nm or larger.

Further, to the negative electrode active material, carbonaceous material such as acetylene black, ketjen black, or graphite and a conductive material such as a metal powder may optionally be added properly also to the negative electrode active material.

The negative electrode active material layer in the present invention is preferably those formed by molding a negative electrode active material containing the negative electrode active material such as the carbon material or PAS and in an easy moldable shape such as powdery, granular or short fiber-like shape with a binder resin. The binder resin may, for example, be those insoluble to the organic electrolyte to be described later and an aqueous resin using water as a dispersant or a solvent, or a non-aqueous resin using an organic solvent such as alcohol or N-methylpyrrolidone as a dispersant or a solvent can be used. For example, a styrene butadiene rubber binder (hereinafter simply referred to as SBR) type resin and a carboxymethyl cellulose type resin are aqueous resin, and phenol resin or melamine resin can be used as the aqueous resin or the non-aqueous resin depending on the composition. Further, acrylic resin, polyamide resin, polyethylene resin, etc. can be used also as an aqueous resin by emulsification. On the other hand, fluoro-containing resins such as polytetrafluoro ethylene, polyfluoro vinylidene, etc. polyimide resin, polyamide imide copolymer resin are typical examples of the non-aqueous resin.

Among them, fluoro and aqueous SBR series resins, acrylic resins and non-aqueous fluoro resins are preferred.

The thickness of the negative electrode active material layer is designed while considering the balance with the thickness relative to the positive electrode active material layer so that the energy density of the cell can be ensured. As the thickness of the negative electrode active material layer can be made thinner, more effective utilization of the active material is possible to improve the power density. On the other hand, in a case where the thickness of the active material layer is excessively thin, it is not preferred since the energy density of the cell is lowered. Also in view of the industrial productivity, the thickness of the negative electrode active substance layer in the present invention is, usually, from 15 to 100 μm and, preferably, from 20 to 80 μm.

The mixing ratio of the binder resin is from 1 to 20%, preferably, from 2 to 10% and, particularly preferably, from 2 to 5% on the weight basis relative to the active material.

[D] Positive Electrode

In the organic electrolyte capacitor of the present invention, the positive electrode contains a positive electrode active material, capable of reversibly supporting lithium ions and/or anions like tetrafluoroborate.

The positive electrode active substance is not particularly restricted so long as it can reversibly support lithium ions and/or anions and, for example, coke, pitch, resin, various kinds of activated carbon using plants such as coconut shell, saw dust, etc. used as starting material and activated by using steams, carbon dioxide, or potassium hydroxide, conductive polymer, polyacene material, mesoporous carbon material in which mesopores with the pore diameter of from 20 to 500 Å are developed remarkably, etc. can be used.

For example, a polyacene material (PAS) formed from a curing product obtained by preparing a solution containing condensation product of an aromatic condensed polymer and an inorganic salt, for example, zinc chloride, heating the solution and curing the same in a molding die, applying a heat treatment by gradually heating in a non-oxidative atmosphere (also including vacuum) to a temperature of 350 to 800° C., preferably, to an appropriate temperature of 400 to 750° C. and then sufficiently cleaning with water or diluted hydrochloric acid, etc. and having a ratio of number of atoms for hydrogen and carbon, that is, H/C of from 0.05 to 0.5 and having a specific surface area of 600 $m^2/g$ or more according to the BET method can be used suitably.

The positive electrode active material layer of 3 nm in the present invention is molded by optionally adding a conductive material, a binder resin, etc. to the positive electrode active substance described above, and the kind, the composition, etc. of the conductive material and the binder resin can be properly determined.

As the conductive material, carbonaceous material, for example, activated carbon, carbon black such as acetylene black and ketjen black and graphite can be used suitably. While the mixing ratio of the conductive material is different depending on the electroconductivity of the active substance, the electrode shape, etc. it is preferably added at a ratio from 2 to 40% based on the active substance.

The binder resin may be, for example, those insoluble to the organic electrolyte to be described later and an aqueous resin using water as a dispersant or a solvent, or a non-aqueous resin using an organic solvent such as alcohol or N-methylpyrrolidone as a dispersant or a solvent can be used. For example, a rubber type binder resin such as SBR or carboxymethyl cellulose resin is an aqueous resin and a phenol resin or a melamine resin may be used either as the aqueous resin or as the non-aqueous resin depending on the composition.

Further, acrylic resin, polyamide resin, polyethylene resin, etc. can be used as the aqueous resin by emulsification. On the other hand, a fluoro-containing resin such as polytetrafluoro ethylene or polyfluoro vinylinene, polyimide resin, and polyamide-imide copolymer resin are typical examples of the non-aqueous resin.

Among them, fluoro or aqueous SBR type resin, acrylic resin or non-aqueous fluoro resin is preferred.

The mixing ratio of the binder resin is from 1 to 20%, preferably, from 2 to 10% and, particularly preferably, from 2 to 5% on the weight basis relative to the active substance.

The thickness of the positive electrode layer on one side in the present invention is usually from 30 to 150 μm and, preferably, from 60 to 100 μm.

The thickness of the positive electrode active material layer is designed while considering the balance for the thickness relative to the negative electrode active material layer such that the energy density of the cell can be ensured. As the thickness of the positive electrode active material layer can be made thinner, effective utilization of the active substance is possible to improve the power density. On the other hand, in a case where the thickness of the active material layer is excessively thin, it is not preferred since the energy density of the cell is lowered and, also in view of the industrial productivity, the thickness of the positive electrode active material layer as described above can be used preferably in the present invention.

[E] Lithium Ion Supply Source

As an example of the organic electrolyte capacitor of the present invention, a lithium electrode 7 is preliminarily disposed inside the organic electrolyte capacitor as a lithium ion supply source for preliminarily supporting lithium ions on the negative electrode and/or positive electrode. As the lithium ion supply source, a substance containing at least a lithium element and capable of supplying the lithium ions such as metal lithium or lithium-aluminum alloy is used.

A sufficient amount of the lithium ion supply source (weight of a substance such as metal lithium capable of supplying lithium ions) disposed inside the organic electrolyte capacitor may be such an amount as capable of providing a predetermined capacity of the negative electrode and, in a case where more amount is disposed, the lithium electrode 7 may be left inside the organic electrolyte capacitor after supporting a predetermined amount from the lithium electrode. However, in view of the safety, it is preferred to dispose only the necessary amount and the entire amount is supported on the negative electrode and/or the positive electrode.

In the present invention, the lithium ion supply source is preferably formed on a lithium electrode current collector comprising a conductive porous member, but the lithium electrode current collector may not be used. As the conductive porous member to form the lithium electrode current collector, it is preferred to use a metal porous member not reacting with the lithium ion supply source such as a stainless steel mesh.

For example, in a case of using metal lithium as the lithium ion supply source and using a conductive porous member such as a stainless steel mesh as the lithium electrode current collector, it is preferred that at least a portion of the metal lithium is buried in the pore portion of the lithium electrode current collector. Preferably, 80% or more of the metal lithium is filled and disposed to the pore portion of the conductive porous member. This decreases a gap formed between the electrodes by the elimination of metal lithium and can reliably maintain the reliability of the organic electrolyte capacitor even after supporting the metal lithium on the negative electrode.

Figure 8:
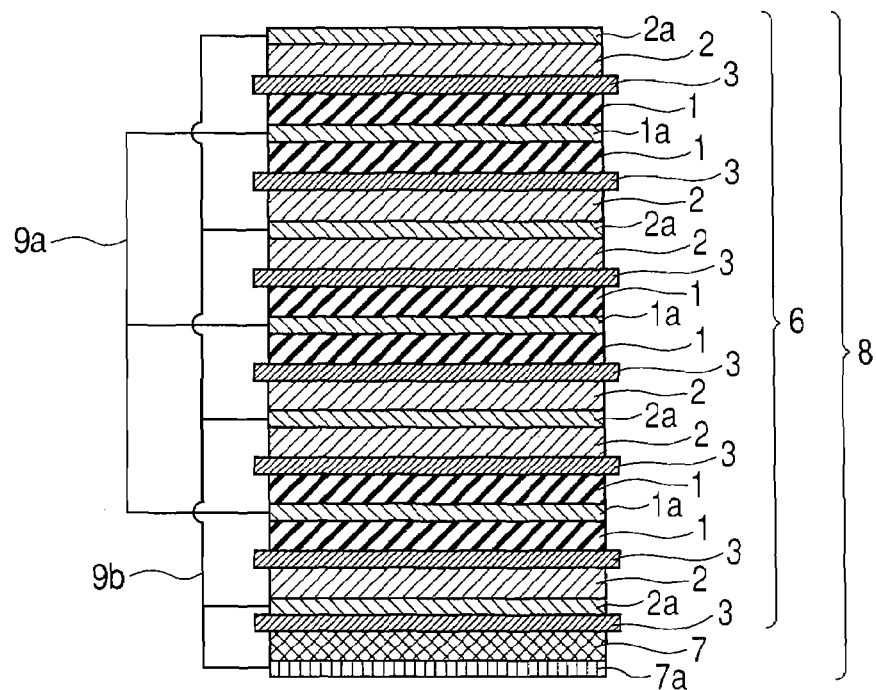
FIG. 8 is a cross sectional view showing a first example for the layer constitution of a three electrode lamination unit.
Figure 9:
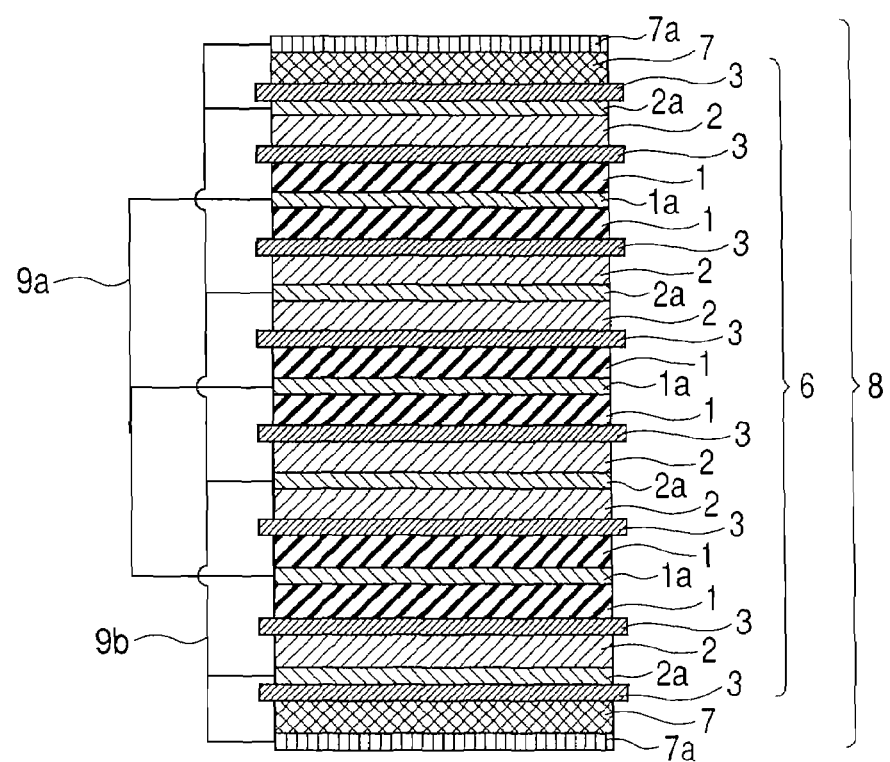
FIG. 9 is a cross sectional view showing a second example for the layer constitution of a three electrode lamination unit.
Figure 10:
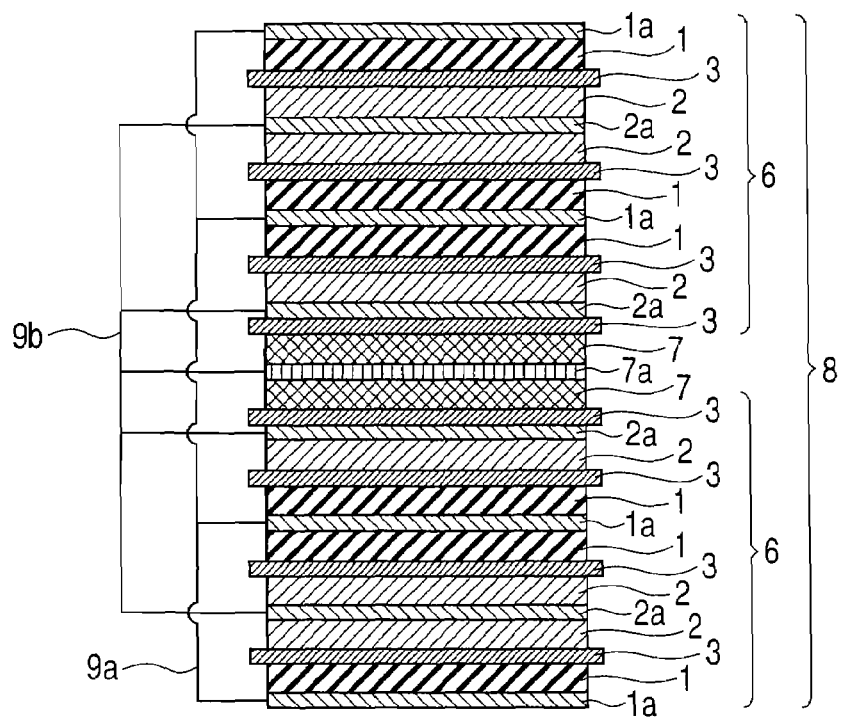
FIG. 10 is a cross sectional view showing a third example for the layer constitution of a three electrode lamination unit.

The lithium electrode current collector forming the lithium ion supply source is preferably disposed so as to oppose the negative electrode or the positive electrode. For example, in FIG. 8, a lithium electrode 7 in which metal lithium is pressure bonded to a lithium electrode current collector 7a is disposed below an electrode lamination unit 6 formed by successively laminating a positive electrode 1, a separator 3, and a negative electrode 2, to form a three-electrode lamination unit 8. FIG. 9 shows another layer structure of the three-electrode lamination unit. Further, in FIG. 9, a lithium electrode 7 in which metal lithium is pressure bonded to a lithium electrode current collector 7a is disposed above and below the electrode lamination unit 6, to form a three-electrode lamination unit 8. Further, in other embodiment shown in FIG. 10, a lithium electrode 7 is disposed at the center of the two electrode lamination units 6 to form a three-electrode lamination unit 8. With such an arrangement, lithium ions can be supported smoothly on the negative electrode. While it is also possible to dispose the lithium electrode 7 pressure bonded with metal lithium in the cross sectional direction of the electrode lamination unit, and short-circuit the negative electrode terminal and/or the positive electrode terminal with the lithium electrode terminal to thereby support the lithium ions on the negative electrode active material and/or positive electrode active material. However, since unevenness for support in the electrode may possibly be increased when the width of the negative electrode and/or the positive electrode is large in this case, the position of disposing the lithium electrode has to be selected properly while considering the cell structure, electrode size, etc.

In the organic electrolyte capacitor of the present invention, by locally disposing the lithium electrode to be supported on the negative electrode and/or the positive electrode at a predetermined position, the degree of freedom for the cell design and the productivity can be improved, as well as excellent charge/discharge characteristics can be provided.

[F] Electrolyte

As the electrolyte used for the organic electrolyte capacitor of the present invention, an electrolyte capable of transporting lithium ions is used. Such an electrolyte is usually in a liquid form and impregnated in the separator. As the separator, a porous member with no electronic conductivity, having communication pores and durable to the electrolyte or the electrode active material can be used. Further, while a gel or solid-like electrolyte can also be used, a separator is not used sometimes in this case and this is effective for preventing liquid leakage.

As the electrolyte capable of transporting the lithium ions, with a view point of not causing electrolysis even under a high voltage and that the lithium ions can be present stably, lithium salts, for example, $LiClO_4$, $LiAsF_6$, $LiBF_4$, $LiPF_6$, $Li(C_2F_5SO_2)_2N$ can be used preferably. Further, as the solvent for dissolving the lithium salt, an aprotic organic solvent is used preferably.

The aprotic organic solvent includes, for example, ethylene carbonate, propylene carbonate, dimethyl carbonate, diethyl carbonate, γ-butyrolactone, acetonitrile, dimethoxyethane, tetrahydrofuran, dioxolane, methylene chloride, and sulfolane. Further, a liquid mixture formed by mixing two or more kinds of the aprotic organic solvents can also be used.

The electrolyte and the solvent described above are mixed in a sufficiently dewatered state to form an electrolyte. The concentration of the electrolyte in the electrolytic solution is, preferably, at least 0.1 mol/l or more and, particularly, within a range from 0.5 to 1.5 mol/l in order to lower the internal resistance due to the electrolytic solution.

[G] External Casing

The material for the external vessel of the organic electrolyte capacitor of the present invention is not particularly restricted and various materials used generally for batteries or capacitors can be used, and metal materials such as iron and aluminum, plastic materials, or composite materials by laminating them, etc. can be used. Further, the shape of the external casing is not also restricted particularly and it can be properly selected depending on the application use such as a cylindrical or square shape. With a view point of decreasing the size and reducing the weight of the organic electrolyte capacitor, a film-type external casing using a laminate film of aluminum and a polymeric material such as nylon or polypropylene is used preferably.

As described above, in the film battery, a three-layered laminate film formed by bonding a nylon film to the outside and a layer such as of modified polypropylene to the inside of an aluminum film is used as the external material. The laminate film is usually deep drawn to a predetermined size and, after placing a unit formed by laminating or winding a positive electrode, a negative electrode, and a separator and injecting a electrolyte to the inside, the laminate film is sealed by heat-seal or the like to form an electric storage device.

In this case, the positive electrode terminal (for example, aluminum foil of about 100 μm thickness), the negative electrode terminal (for example, nickel foil of about 100 μm thickness) can be led from a portion between the laminate films to the outside of the cell respectively. That is, sealing for the laminate film can be attained by a simple and convenient method of fusing in a state of sandwiching the positive electrode terminal and the negative electrode terminal. However, for making a sufficient sealing state, it is preferred to device such that a thin metal foil is used for the terminal as described above, or a sealant film is preliminarily bonded to the surface of the terminal.

In FIG. 1, while laminate films 4, 5 are used as the external casing and deep drawing is applied to the laminate film 5 for the thickness of the three-electrode lamination unit, deep drawing may also be applied to one or both of the laminate films 4, 5. In FIG. 1, a set of two sheets is used as the laminate film and they are stacked so as to cover the content and the stacked outer peripheries are heat sealed to tightly seal the content.

In the present invention, it is not restricted to the sheet-film as used in FIG. 1 but a film member previously shaped into a cylindrical shape or bag-like shape may also be used. In a case of using the cylindrically formed film member, the content is sealed by heat sealing two sides opposed to each other. In a case of using the bag-like film member the content is sealed by heat sealing an opened end.

[H] Principle of Organic Electrolyte Capacitor of the Present Invention

In an existent electric double layer capacitor, identical active material (mainly activated carbon) is used substantially in an identical amount for the positive electrode and the negative electrode. The active material used for the positive electrode and the negative electrode has a potential at about 3 V based on $Li/Li^+$ potential upon assembling the cell. Upon charging, anions form an electric double layer on the surface of the positive electrode to increase the positive electrode potential and, on the other hand, cations form an electric double layer on the surface of the negative electrode to lower the potential.

On the contrary, upon discharging, anions are released from the positive electrode and cations are released from the negative electrode respectively into the electrolyte to decrease and increase the potentials respectively to return to the vicinity of 3 V. That is, the profile of a charge/discharge curve for the positive electrode and the negative electrode forms a substantially line-to-line symmetry with 3 V as a boundary and the amount of potential change on the positive electrode and the amount of potential change on the negative electrode are substantially identical. Further, intercalation/deintercalation occur substantially only for anions on the positive electrode and substantially only for cations on the negative electrode.

Meanwhile, in the organic electrolyte capacitor of the present invention, it is preferred to use an active material capable of reversibly supporting lithium ions and/or anions for the positive electrode. The material also includes activated carbon used for the positive electrode and the negative electrode in the existent electric double layer capacitor. Further, a mesopored carbon material having a pore volume of 0.10 ml/g or more for pore diameter of 3 nm or larger is used for the negative electrode active material, which is different from the carbon material such as graphite used generally in a lithium ion secondary battery. Generally, the carbon material such as graphite used in the lithium ion secondary battery scarcely has a pore volume pore volume of fine diameter in a range from 0.8 nm to 50 nm (micropore to mesopore).

Further, the mesopored carbon material of the present invention is preferably activated carbon, coconut husk coal, coke, charcoal, bamboo coal, resin carbonization product, and mixture thereof and, among all, use of a phenol resin carbonization product or a resin carbonization product in which the resin is a phenol resin is further preferred.

Further, the mesopore carbon material can be produced simply and conveniently by impregnating an Ni compound such as $NiNO_3$ to a phenol resin carbonization product, etc. and then applying a heat treatment at about 900° C. in a nitrogen gas atmosphere.

In the organic electrolyte capacitor of the present invention, lithium ions are preferably supported previously to the negative electrode and/or the positive electrode so that the positive electrode potential is 2.0 V ($Li/Li^+$) or lower upon short-circuiting the positive electrode and the negative electrode. Since the carbon material usually has a potential ($Li/Li^+$) of about 3.0 V, in an organic electrolyte capacitor using the carbon material both for the positive electrode and the negative electrode, the positive electrode potential is about 3.0 V ($Li/Li^+$) upon short-circuiting the positive electrode and the negative electrode.

In the present invention, the potential on the positive electrode of 2 V or lower after short-circuiting the positive electrode and the negative electrode means such a case where the potential of the positive electrode is 2 V or lower as determined by one of the following two methods (A) or (B). That is, (A) a positive electrode potential which is obtained by doping lithium ions, leaving in a state of directly bonding the positive electrode terminal and the negative electrode terminal of a capacitor cell with a conductive wire for 12 hours or more, then releasing the short-circuit and conducting measurement within 0.5 to 1.5 hrs, and (B) a positive electrode potential obtained by conducting constant current discharge to 0 V for 12 hours or more by a charge/discharge tester, then leaving in a state of coupling the positive electrode terminal and the negative electrode terminal with a conductive wire for 12 hours or more, then releasing the short-circuit and conducting measurement for 0.5 to 1.5 hrs.

Further, in the present invention, a positive electrode potential of 2.0 V or lower after short-circuiting the positive electrode and the negative electrode is not restricted to a case just after the doping of the lithium ions but means that the positive electrode becomes 2.0 V or lower after short-circuiting in any of the states, for example, a charged state, a discharged state, or short-circuited state after repetitive charging and discharging.

It is to be described specifically that the positive electrode potential lowers to 2.0 V or lower after short-circuiting the positive electrode and negative electrode in the present invention. As described above, the activated carbon or carbon material usually has a potential of about 3 V ($Li/Li^+$) and, in a case of assembling the cell using the activated carbon both for the positive electrode and the negative electrode, since the potential on any of them is about 3 V, the positive electrode potential is not changed being at about 3 V even upon short-circuiting. Further, this is also identical in a case of a so-called hybrid capacitor using activated carbon for the positive electrode and a carbon material such as graphite or less graphitizing carbon used in a lithium ion secondary battery for the negative electrode. Since the potential is at about 3 V in any of the cases, the positive electrode potential is not changed but being at about 3 V even upon short-circuiting. Since the negative electrode potential undergoes a transition to about 0 V upon charging while depending on the weight balance between the positive electrode and the negative electrode and the charging voltage can be made higher, a capacitor having high voltage and high energy density is provided. Generally, since the upper limit for the charging voltage is determined as a voltage not causing the decomposition of the electrolyte due to increase of the positive electrode potential, the charging voltage can be increased by so much as the lowering of the negative electrode potential in a case of determining the positive electrode potential as the upper limit. However, in the hybrid capacitor described above where the positive electrode potential is about 3 V upon short-circuiting, the positive electrode potential upon discharge is up to 3.0 V in a case of setting the upper limit potential of the positive electrode, for example, as 4.0 V, the positive electrode potential upon discharge is up to 3.0 V, so that the potential change of the positive electrode is about 1.0 V and the capacitance of the positive electrode can not be utilized fully. After, in a case of intercalating (charging) or deintercalating (discharging) lithium ions to and from the negative electrode, it has been known that the initial charge/discharge efficiency is often low and lithium ions that can not be deintercalated upon discharge are present. Descriptions have been made as a case that they are consumed for the decomposition of the electrolyte on the surface of the negative electrode or they are trapped in the structural defect in the carbon material. In this case, the charge/discharge efficiency on the negative electrode is lowered compared with the charge/discharge efficiency on the positive electrode and the positive electrode potential is higher than 3 V when short-circuiting the cell after repeating charging and discharging to further lower the utilizable capacity. That is, while the positive electrode could be discharged from 4.0 V to 2.0 V, in a case where it can be used only from 4.0 V to 3.0 V, this means that only one-half of the capacity is utilized in which high voltage is obtained but high capacity can not be attained.

In the hybrid capacitor, for not only increasing the voltage and the energy density but also increasing the capacity and, further, the energy density, it is necessary to improve the utilizable capacity of the positive electrode.

In a case where the positive electrode potential after short-circuiting is decreased to lower than 3.0 V, the utilizable capacity increases by so much to provide high capacity. In order to lower the potential to 2.0 V or lower, it is preferred to charge the lithium ions on the negative electrode from a lithium ion source such as metal lithium separately not only with the amount charged by the charge/discharge of the cell. Since the lithium ions are supplied from other portion than the positive electrode and the negative electrode, the positive electrode, the negative electrode, and the metal lithium are at an equilibrium potential so that both the positive electrode potential and the negative electrode potential are at 3.0 V or lower and the equilibrium potential is lowered as the amount of the metal lithium increases. Since the equilibrium potential also changes along with change of the negative material and the positive electrode material, it is necessary to control the amount of the lithium ions supported on the negative electrode in view of the characteristics of the negative electrode material and the positive electrode material such that the positive electrode potential is 2.0 V or lower after short-circuiting.

Further, lowering the positive electrode potential to 2.0 V (Li/Li$^+$) or lower upon short-circuiting the positive electrode and the negative electrode means that lithium ions are supplied to the positive electrode and/or the negative electrode from the portion other than the positive electrode and the negative electrode of the organic electrolyte capacitor. In a case where the positive electrode potential is 2.0 V (Li/Li$^+$) or higher upon short-circuiting the positive electrode and the negative electrode, the energy density of the cell is low since the amount of the lithium ions supplied to the positive electrode and the negative electrode is small. As the amount of the lithium ions supplied increases, the positive electrode potential lowers and the energy density is improved upon short-circuiting the positive electrode and the negative electrode. For obtaining a high energy density, 2.0 V (Li/Li$^+$) or lower is preferred and 1.0 V (Li/Li$^+$) or lower is more preferred.

Further, another effect includes that the charging voltage can be increased as the amount of the lithium ions supplied to the negative electrode increases. The limit of increasing the charging voltage of the capacitor is substantially determined depending on the positive electrode potential. That is, since oxidative decomposition of the electrolyte occurs as the positive electrode potential is higher, this is a limit potential. As compared with a usual electric double layer capacitor having the cell structure of using an identical activated carbon electrode for the positive electrode and the negative electrode, in the organic electrolyte capacitor of the invention having the structure of preliminarily supporting the lithium ions, since the negative electrode potential is lower, the difference between the positive electrode potential and the negative electrode potential can be made greater. Then, while the withstanding voltage is about 2.3 to 2.7 V in the existent electric double layer capacitor, this can be set by 3 V or higher as about 3.6 to 4.1 V in the constitution of the invention and the energy density can be improved.

[I] Method of Manufacturing an Organic Electrolyte Capacitor

Hereinafter, an example for a method of manufacturing an organic electrolyte capacitor according to the invention is shown. While through holes in the electrode current collectors in the organic electrolyte capacitor may or may not be clogged with a conductive material, description is to be made in a case of closing them in this example. Means for clogging the through holes in the electrode current collector with a conductive material is not particularly restricted and known methods such as a die method, a dipping method, a coating method such as spraying method, and printing methods such as a gravure, screen or transfer method can be used.

Further, while the conductive material is not particularly restricted, graphite such as natural graphite or artificial graphite, various carbon materials such as coke, pitch, resin and plant, carbon blacks such as acetylene black and ketjen black, polyacene substances, tin oxides and silicon oxides can be exemplified. Further, a powder of metal such as metal nickel may also be used. Among them, particularly preferred conductive material includes graphite, acetylene black, or ketjen black.

Then, a positive electrode and a negative electrode are formed on an electrode current collector in which through holes are clogged with the conductive material. The positive electrode is formed by mixing a positive electrode active material and a binder resin to form a slurry, and coating and drying the same on a positive electrode current collector. The negative electrode is also formed by mixing a negative electrode active material and a binder resin to form a slurry and coating and drying the same on the negative electrode current collector.

The lithium electrode is formed by pressure bonding metal lithium on a lithium electrode current collector comprising a conductive porous member. The thickness of the lithium electrode current collector is about from 10 to 200 μm, and the thickness of the metal lithium is generally about 50 to 300 μm while depending on the amount of the negative electrode active material to be used.

The electrode, after drying, is cut into a width corresponding to the size of an external casing for the organic electrolyte capacitor. In a case of preparing an electrode lamination unit of a wound type structure, it is cut into a ribbon-shape. In this case, it may be cut into a shape having a lead portion as a terminal weld portion.

Figure 11:
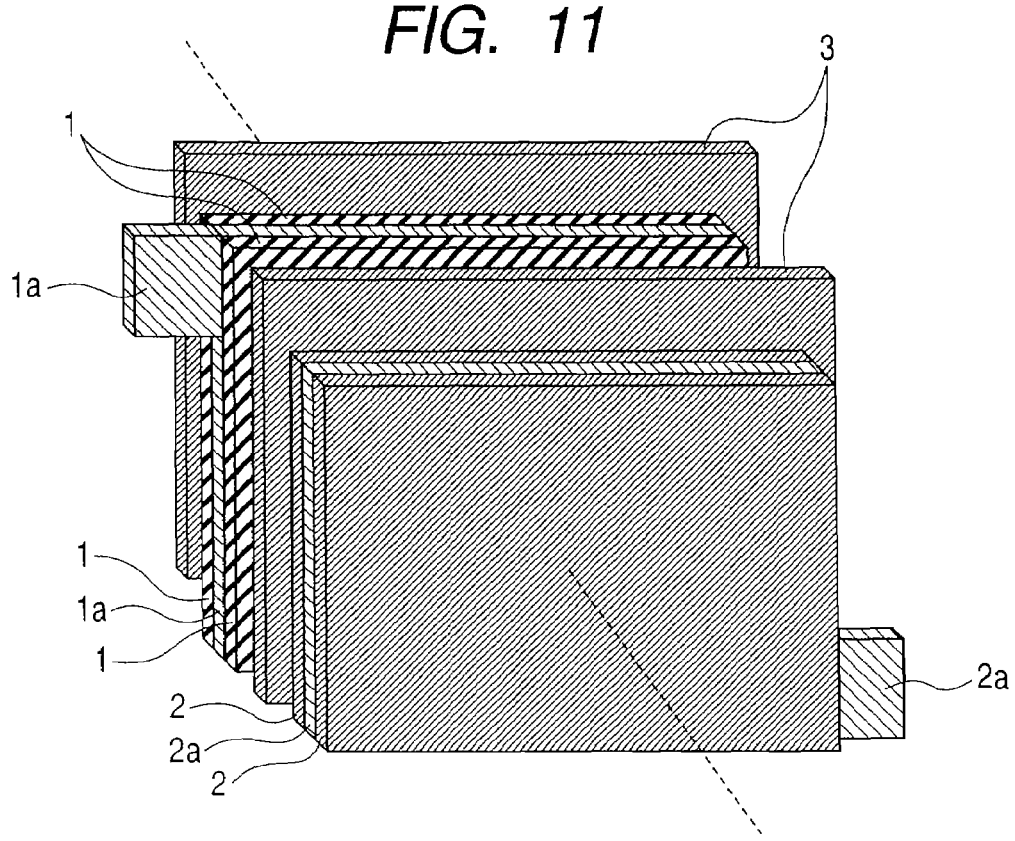
FIG. 11 is an expanded perspective view showing an example of an electrode lamination unit.
Figure 12:
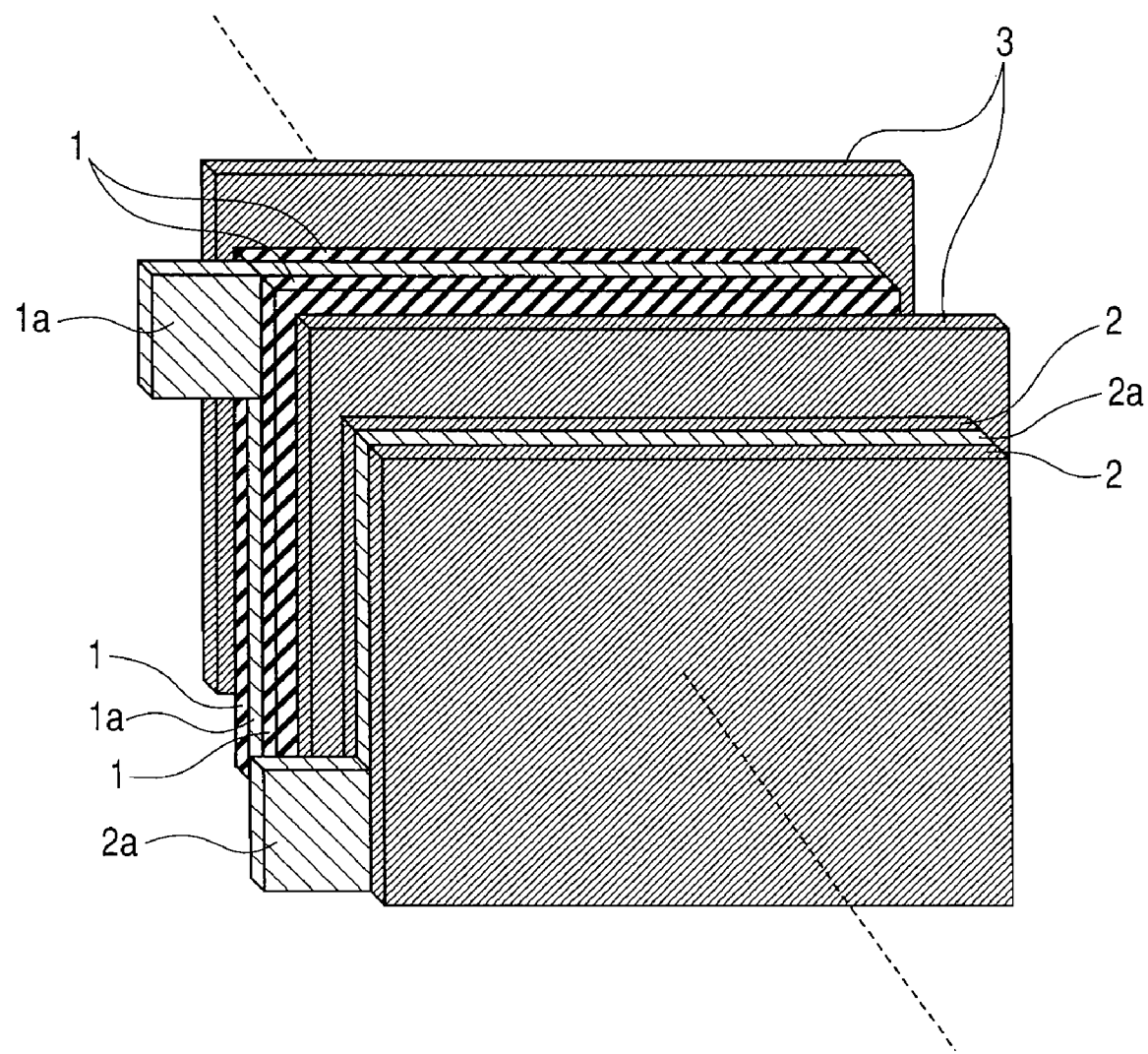
FIG. 12 is an expanded perspective view showing an example of an electrode lamination unit.

Then, electrode current collectors each formed with an electrode are assembled to a three-electrode lamination unit while sandwiching separators such that the positive electrode and the negative electrode are not in direct contact with each other. FIGS. 11 and 12 are developed view of an electrode lamination unit showing the shape and the lamination direction of terminal weld portions. FIG. 11 is an example where a terminal weld portion of a positive electrode and a terminal weld portion of a negative electrode are led out from respective opposite sides and FIG. 12 is an example where the terminal weld portion of the positive electrode and the terminal weld portion of the negative electrode are led out from an identical side. The direction of the terminals of the positive electrode and the negative electrode are not restricted only to the two types.

For the assembled three-electrode lamination unit, the terminal weld portion of the positive electrode current collector and the positive electrode terminal, and the terminal weld portion of the negative electrode current collector and the lithium electrode current collector and the negative electrode terminal are welded respectively by supersonic welding or the like.

The three-electrode lamination unit welded with an external terminal is placed inside an external vessel, and the external casing is closed by heat-seal, etc. while leaving an electrolyte charging port. In this case, the external terminal is in a state at least a portion thereof is exposed to the outside of the external casing such that it can be connected with an external circuit. An electrolyte is injected from the electrolyte injection port of the external casing, to fill the electrolyte inside the external casing and then the electrolyte injection port is closed by heat fusion, etc. to completely seal the external casing, whereby the organic electrolyte capacitor of the present invention is obtained.

When the electrolyte is injected, all the negative electrodes and the lithium electrode are in contact electrochemically, and lithium ions leached from the lithium electrode into the electrolyte gradually transfers to the negative electrode along with lapse of time and supported on the negative electrode. Upon supporting the lithium ions on the negative electrode, it is preferred to device such that an external force is applied for constrain so that the planarity of the negative electrode is not lost by the generation of the deformation of the negative electrode caused by strains generated by intrusion of the lithium ions into the negative electrode.

Particularly, in a film-type battery, the contact pressure from the external casing is weak compared with a battery using a metal case such as a cylindrical or square type battery.

Then, since the strain of the cell per se is removed to improve the cell performance by applying the pressure from the outside to make the positive electrode and the negative electrode planar, this is preferred.

Further, by welding the lithium electrode current collector to an external terminal separately from the negative electrode terminal and providing the lithium electrode terminal at the outside, lithium ion can be supplied after sealing the cell by a method, for example, of externally short-circuiting the negative electrode terminal and the lithium electrode terminal.

[J] Method of Measuring the Pore Volume of Pore Diameter is 3 nm or Greater and Specific Surface Area The pore volume and the specific surface area were measured in the present invention by a nitrogen adsorption method at a liquid nitrogen temperature using a fully automatic gas absorption measuring apparatus (BELSORP 28 (manufactured by Nippon Bell Co., Ltd.). The pore volume for pore diameter of 3 nm or greater was determined by the method of Dollimore-Heal (hereinafter simply referred to as DH method) and the specific surface area was determined by a BET multi-point method.

Outline for the measuring method is to be described below.

1) Measuring Method of Pore Volume for Diameter of 3 nm or More (DH Method)

The cylindrical pore radius is represented by equation (1).

$$rP = t + rk \quad (1)$$

in which
rP: pore radius
rk: pore radius for meniscus portion
t: thickness for adsorption layer at pressure p The thickness of the adsorption layer is determined based on t-plot for a standard specimen and the core radius is determined according to the Kelvin equation (2).

$$ln(p/p0) = -(2\nu VL/RT \cdot rm)\cos\theta \quad (2)$$

in which
p: equilibrium pressure
p0: saturated steam pressure
v: surface tension of liquid
VL: molar volume of liquid
rm: meniscus radius
R: gas constant
T: absolute temperature
θ: contact angle between liquid and pore Assuming that the meniscus radius is equal with the core radius upon desorption and substituting the values for v, VL of nitrogen at a liquid nitrogen temperature (77K) in the equation (2), it gives:

$$rk(nm) = 0.4078/\log(p0/p) \quad (3)$$

The pore volume for pore diameter of 3 nm or larger was determined by measuring an adsorption isothermal curve, and based on the rate of change for rP and the pore volume from the desorption side. Further, since rP is not actually an integer, a maximum accumulated pore volume within a range where rP is 30 or more is defined as a pore volume for pore diameter of 3 nm or greater.

2) Measuring Method for Specific Surface Area

By applying the result of measurement for the nitrogen adsorption isothermal curve at the liquid nitrogen temperature (77K) to the BET equation (4), the single molecule layer adsorption amount vm was determined and the nitrogen molecule occupation area (0.162 nm²) was substituted in the equation (5), to determine the specific surface area S. Further, as the relative pressure (p/p0), a range from about 0.05 to 0.10 was adopted.

$$p/v(p0-p) = (1/vm \cdot C) + \{(C-1)/vm \cdot C\}(p/p0) \quad (4)$$

$$S = vm \cdot \sigma N \quad (5)$$

in which
p: equilibrium pressure
p0: saturated vapor pressure
v: adsorption amount at equilibrium pressure p
vm: single molecule layer adsorption amount
C: constant
S: specific surface area
σN: single nitrogen molecule occupation area Description is to be made more specifically by way of specific examples.

EXAMPLE

Examples 1 to 8, Comparative Examples 1 to 10

(Preparation of Mesopored Carbon Material for Negative Electrode)

As the starting resin material, 50 g of granular phenol resin BELPEARL R700 (manufactured by Kanebo Co.) were uniformly dispersed in an aqueous solution of Ni nitrate conditioned so as to provide a predetermined Ni content to the resin. After drying the slurry at 100° C. for 20 hrs and removing the water content, it was placed in a stationary electric furnace of 8 L inner volume and the temperature was elevated to predetermined temperatures (heat treatment temperature) shown in Table 1 at a temperature elevation rate of 100° C./hr while flowing 0.5 L/min of nitrogen. Subsequently, the retention time at the heat treatment temperature was set to 10 hrs. Since the Ni-treated carbon materials contained incorporated Ni, acid cleaning was repeated twice at 80° C. with 2N HCl for 3 hours to remove Ni. Physical properties of Samples 1 to 5 as the mesopored carbon materials obtained as described above are shown in Table 1.

TABLE 1

| No. | Heat treatment temperature (° C.) | Ni addition amount (%) | Pore volume of 3 nm or greater (cc/g) | Specific surface area (m²/g) |
|---|---|---|---|---|
| Sample 1 | 1000 | 0 | 0.045 | 1080 |
| Sample 2 | 700 | 5 | 0.039 | 590 |
| Sample 3 | 800 | 5 | 0.109 | 570 |
| Sample 4 | 900 | 5 | 0.122 | 240 |
| Sample 5 | 1000 | 5 | 0.153 | 220 |

(Preparation of Products Conditioned for Pore Volume and Specific Surface Area)

Samples 6 to 9 having the pore volume and the specific surface area other than samples 1 to 5 were prepared. Sample 8 was commercially available coconut shell activated carbon and sample 6, 7 and 9 were prepared by the following method.

(Preparation of Sample 6)

Sample 6 with a specific surface area of 1340 m²/g and having a pore volume of 0.304 ml/g for 3 nm or larger was prepared, after applying a heat treatment at 1000° C. for 10 hours upon preparation of Sample 5 and, further, activating the same at 1000° C. with a 1:1 gas mixture of nitrogen/steam for 5 hours.

(Preparation of Specimen 7)

Sample 7 with a specific surface area of 2040 m²/g and having a pore volume of 0.092 ml/g for 3 nm or larger was prepared, after applying a heat treatment at 1000° C. for 10 hours upon preparation of Sample 1 and, further, activating the same at 1000° C. with a 1:1 gas mixture of nitrogen/steam for 6 hours.

(Preparation of Sample 9)

Sample 9 having a specific surface area of 8 m²/g and pore volume of 0.003 ml/g for 3 nm or larger was prepared by flowing nitrogen for 2 hours, stopping nitrogen after purging the inside of the electric furnace and attaching a check valve to an exhaust port of the electric furnace upon applying a heat treatment at 1000° C. for preparation of Sample 1 to add an organic gas impregnated in the heat treatment.

Table 2 shows lists for the pore volume and the specific surface area.

TABLE 2

| No. | Content | Pore volume of 3 nm or greater (cc/g) | Specific surface area (m²/g) |
|---|---|---|---|
| Sample 6 | Activated product of Sample 5 | 0.304 | 1340 |
| Sample 7 | Activated product of Sample 1 | 0.092 | 2040 |
| Sample 8 | Shirasagi PC (manufactured by Nippon Embiro Chemicals) | 0.081 | 1820 |
| Sample 9 | Gas addition product of Sample 1 | 0.003 | 8 |

(Preparation of Negative Electrodes 1 to 9)

Negative electrode slurries 1 to 9 were obtained by thoroughly mixing a composition comprising 92 parts by weight of each of the samples 1 to 9, 6 parts by weight of an acetylene black powder, 5 parts by weight of SBR, 3 parts by weight of carboxymethyl cellulose, and 110 parts by weight of ion exchanged water. The slurry was coated on one surface of a copper foil of 18 μm thickness by about 7 mg/cm² as a solid, dried and then pressed to obtain negative electrodes 1 to 9 for evaluation.

(Preparation of Positive Electrode 1)

Activated carbon having a specific surface area of 1860 m²/g was prepared by using 100 g of saw dusts as the starting material, using the electric furnace described above, elevating the temperature up to 950° C. at a temperature elevation rate of 50° C./hr while flowing 0.5 L/min of nitrogen and then activating the same with a 1:1 gas mixture of nitrogen/steam for 6 hours. The activated carbon was pulverized in a ball mill pulverizer to obtain an activated carbon powder with an average grain size of 5 μm.

A slurry was obtained by sufficiently mixing a composition comprising 92 parts by weight of an activated carbon powder, 6 parts by weight of an acetylene black powder, 7 parts by weight of SBR, 4 parts by weight of carboxymenyl cellulose, and 180 parts by weight of ion exchanged water. The slurry was coated on one surface of an aluminum foil of 20 μm thickness coated with a carbon conductive paint by about 14 mg/cm² as solids and dried and pressed to obtain a positive electrode 1.

(Charge/Discharge Characteristic Evaluation for the Single Negative Electrode)

The negative electrodes 1 to 9 were cut each into a size of 1.5×2.5 cm² to prepare negative electrodes 1 to 9 for evaluation. Simulated cells were assembled each by two cells using metal lithium of 1.5×2.0 cm² size and 250 μm thickness as a negative electrode and a counter electrode by way of non-woven polyethylene fabric of 50 μm thickness as a separator. Metal lithium was used as a reference electrode. As an electrolyte, a solution formed by dissolving $LiPF_6$ at a concentration of 1 mol/l to a mixed solvent of ethylene carbonate, diethyl carbonate, and propylene carbonate at a weight ratio of 3:4:1 was used.

One cell was charged by constant current up to 0.025 V by a charging current of 2.5 mA and then discharging was conducted at a constant current to 0.5 V using a discharging current of 2.5 mA. The charge/discharge cycle was repeated and the result of measuring the discharge capacity at 5th cycle is shown in Table 3. Further, same charge/discharge cycles were repeated after leaving them in a thermostatic bath at −20° C. for 6 hours, by repeating charge/discharge cycles at a charging current and a discharging current each of 1.0 mA. Table 3 shows the result of measuring the discharge capacity at the 5th cycle and the ratio between the discharge capacity at −20° C. and the discharge capacity at room temperature at the 5th cycle.

TABLE 3

|  |  | Discharge capacity/room temperature (mAh) | Discharge capacity/−20° C. (mAh) | Ratio (%) |
|---|---|---|---|---|
| Comp. Example 1 | Sample 1 | 2.12 | 0.06 | 3 |
| Comp. Example 2 | Sample 2 | 2.44 | 0.07 | 3 |
| Example 1 | Sample 3 | 2.38 | 0.56 | 24 |
| Example 2 | Sample 4 | 2.42 | 0.84 | 35 |
| Example 3 | Sample 5 | 2.50 | 1.01 | 40 |
| Example 4 | Sample 6 | 2.21 | 1.43 | 65 |
| Comp. Example 3 | Sample 7 | 1.68 | 0.21 | 13 |
| Comp. Example 4 | Sample 8 | 2.59 | 0.11 | 4 |
| Comp. Example 5 | Sample 9 | 3.44 | 0.02 | 0.6 |

As shown in Table 3, Samples 3 to 6 which were mesopored carbon material having a pore volume of 0.10 ml/g or more for pore diameter of 3 nm or larger in the present invention had a large capacity that the ratio between the discharge capacity at −20° C. and the discharge capacity at a room temperature exceeded 20%.

(Charge/Discharge Characteristics Evaluation for Organic Electrolyte Capacitor)

The positive electrode 1 was cut out each into 1.5×2.0 cm² size by 9 sheets and used as the positive electrode 1 for evaluation. After charging at a constant current up to 0.025 V with a charging current of 2.5 mA and after discharging at a constant current to 0.2 V using a discharging current of 2.5 mA, for each of the remaining cells for evaluation of the negative electrode, the cell was decomposed, the lithium of the counter electrode was replaced with the positive electrode for evaluation, then assembled an organic electrolyte capacitor. Charging was conducted at a constant current of 2.5 mA till the cell voltage increased to 3.6 V and then discharging was conducted at a constant current of 2.5 mA till the cell voltage was lowered to 1.6 V.

Table 4 shows the result of repeating the cycles of 3.6 V to 1.6 V and measuring the discharging capacity at the 5th cycle. Further, Table 4 shows the result of measuring the discharging capacity at the 5th cycle by leaving in a thermostatic bath at −20° C. for 6 hours, then, repeating the identical charge/discharge cycles while setting the charging current and the discharging current to 1.0 mA, and measuring the discharging capacity at the 5th cycle, as well as a ratio of the discharge capacity between −20° C. and at a room temperature.

TABLE 4

|  |  | Discharge capacity/room temperature (mAh) | Discharge capacity/−20° C. (mAh) | Ratio (%) |
|---|---|---|---|---|
| Comp. Example 6 | Sample 1 | 1.78 | 0.04 | 2 |
| Comp. Example 7 | Sample 2 | 1.86 | 0.04 | 2 |
| Example 5 | Sample 3 | 1.84 | 0.39 | 21 |
| Example 6 | Sample 4 | 1.85 | 0.56 | 30 |
| Example 7 | Sample 5 | 1.86 | 0.69 | 37 |
| Example 8 | Sample 6 | 1.86 | 1.13 | 61 |
| Comp. Example 8 | Sample 7 | 1.76 | 0.18 | 10 |
| Comp. Example 9 | Sample 8 | 1.76 | 0.05 | 3 |
| Comp. Example 10 | Sample 9 | 1.85 | 0 | 0 |

As shown in Table 4, the organic electrolyte capacitor using, as an anode, Samples 3 to 6 as a mesopored carbon material having a pore volume of 0.10 ml/g or more for pore diameter of 3 nm or larger according to the present invention has a large capacity even at −20° C., and the ratio of the discharge capacity at −20° C. and the discharge capacity at a room temperature exceeded 20%.

Example 9

(Charge/Discharge Characteristics Evaluation 2 for Organic Electrolyte Capacitor)

The positive electrode 1 was cut out into 5 sheets each of 1.5×2.0 cm² size and used as a positive electrode 1 for evaluation. Further, the negative electrode 4 for evaluation was also cut out into five sheets, the cell identical with that for the evaluation of charge/discharge characteristics of the single negative electrode of Example 1 was assembled and lithium was preliminarily supported by 0, 100, 200, 300, and 400 mAh/g per weight of the negative electrode active material. Then, the cell was decomposed and the lithium of the counter electrode was replaced with the positive electrode 1 for evaluation and the organic electrolyte capacitor was assembled by the number 5 cells. Each of them was charged with a constant current of 2.5 mA till the cell voltage reached 3.6 V and then discharged with a constant current of 2.5 mA till the cell voltage reached 1.6 V. the 3.6 V-1.6 V cycles were repeated and Table 5 shows a result of measuring the discharge capacity at 5th discharge capacity. Further, positive electrode and the negative electrode were short-circuited after the completion of measurement and, after leaving for 12 hours, potential for the positive electrode was measured using a reference electrode and Table 5 shows the result of measuring the potential of the positive electrode using the reference electrode.

TABLE 5

| Lithium support amount (mAh/g) | Discharge capacity (mAh) | Positive electrode potential (V) |
|---|---|---|
| 0 | 0.24 | 3.6 |
| 200 | 1.02 | 2.5 |
| 400 | 1.59 | 1.7 |
| 500 | 1.83 | 1.2 |
| 650 | 1.94 | 0.8 |

As shown in Table 5, the cell discharging capacity increased at the positive potential of 2V or lower and it was further increased at 1 V or lower. That is, it is preferred to preliminarily support lithium ions on the negative electrode in view of obtaining a high discharge capacity.

Example 10

(Charge/Discharge Characteristics Evaluation 3 for Organic Electrolyte Capacitor)

(Method of Preparing a Negative Electrode 10 Using a Current Collector Having Surface-to-Rearface Through Hole)

A non-aqueous carbon type conductive paint (EB-815, manufactured by Nippon Achison Co.) was coated by spray-method on both surfaces of a copper expanded metal of 32 μm thickness (porosity: 50%) (manufactured by Nippon Metal Industry Co.) and dried to obtain a negative electrode current collector formed with a conductive layer. The entire thickness (total for the thickness of the current collector and thickness of the conductive layer) was 49 μm, and the through holes were substantially clogged with the conductive coating material. The slurry of the negative electrode 5 was formed on both surfaces of the negative electrode current collector by using a roll coater to obtain a negative electrode 10 of the total thickness for the entire electrode after pressing of 153 μm (total for the thickness of the negative electrode layer on both surfaces and the total for the thickness of the conductive layer and the total for the negative electrode current collector) to obtain a negative electrode 10 of 153 μm.

(Method of Preparing a Positive Electrode 2 Using a Current Collector Having Surface-to-rearface Through Hole)

A non-aqueous carbon type conductive coating material (EB-815, manufactured by Nippon Achison Co.) was coated by spray-method on both surfaces of an aluminum expanded metal of 35 μm thickness (porosity: 50%) (manufactured by Nippon Metal Industry Co.) and dried to obtain a positive electrode current collector formed with a conductive layer. The entire thickness (total for the thickness of the current collector and the thickness of the conductive layer) was 52 μm, and the through holes were substantially clogged with the conductive coating material. The slurry of the positive electrode 1 was formed on both surfaces of the positive electrode current collector by using a roll coater to obtain a positive electrode 2 with the thickness for the entire electrode after pressing of 218 μm (total for the thickness of the positive electrode layer on both surfaces and the thickness of the conductive layer and positive electrode current collector) on both surfaces.

(Preparation of Cell)

A negative electrode 10 of 153 μm thickness and a positive electrode 2 of 218 μm thickness were cut each in a shape as shown in FIG. 11 such that the electrode area was 5.0×8.0 cm² respectively, and they were arranged such that the weld portions with the connection terminals for the positive electrode current collector and the negative electrode current collector (hereinafter referred to as "weld portion for connection terminal") were on the opposite side respectively as shown in FIG. 11, and laminated to the cell thickness of about 4 mm using a cellulose/rayon non-woven mixed fabric of 30 μm thickness as a separator. The number of sheets for each of the positive electrodes and the negative electrodes was 8. The separators were disposed for the uppermost portion and the lowermost portion and the four sides were set by tapes to obtain an electrode lamination unit. A metal lithium foil of 110 μm thickness pressure bonded to a stainless steel mesh of 80 μm thickness was used as the metal lithium for 500 mAh/g relative to the weight of the negative electrode active material, and it was disposed by one to the outermost portion of the electrode lamination unit so as to oppose to the negative electrode. Stainless steel meshes pressure bonded with the negative electrode (by the number of 8 sheet) and lithium were welded respectively and contacted to obtain an electrode lamination unit.

An aluminum positive electrode terminal of 10 mm width, 30 mm length, and 0.2 mm thickness in which a sealant film was preliminarily heat-sealed to a seal portion was stacked and welded by supersonic waves to the terminal weld portion (8 sheets) of the positive electrode current collector of the electrode lamination unit. In the same manner, a nickel negative electrode terminal of 10 mm width, 30 mm length, and 0.2 mm thickness in which a sealant film was heat-sealed preliminarily to a seal portion was welded by supersonic waves to the terminal weld portion (8 sheets) of the negative electrode collector and placed inside two sheets of exterior film deep drawn to 102 mm length, 52 mm width, and 2 mm depth (space for 4 mm in total). After heat fusing two sides and one other side of the terminal portions for the external laminate film, and after vacuum impregnating a solution formed by dissolving $LiPF_6$ to a concentration of 1 mol/l to a mixed solvent at a weight ratio of ethylene carbonate, diethyl carbonate and propylene carbonate of 3:4:1 as the liquid electrolyte and then remaining one side was heat fused under a reduced pressure and applying vacuum sealing to assemble three cells of film type organic electrolyte capacitors by conducting vacuum sealing (cell thickness: 4.0 mm)

(Evaluation for Cell Characteristics)

After leaving for 14 days at a room temperature, when one cell was decomposed, since metal lithium was completely disappeared, it was judged that lithium ions were preliminarily charged by 500 mAh/g per unit weight of the negative electrode active material.

Further, for the remaining two cells, constant current-constant voltage charging till got to a cell voltage of 3.6 V with a constant current of 1000 mA and then applying a constant voltage of 3.6 V was conducted for 1 hour. Then, discharging was conducted at a constant current of 100 mA till the cell voltage reached 1.0 V. The 3.6 V-1.6 V cycle was repeated, and the third discharging capacity was 110 mAh as an average for the two cells. Further, when the length of the cell was 100 mm and the lateral size thereof was 50 mm, the energy density was 15 Wh/l.

In a case laminating electrodes using a positive electrode current collector and a negative electrode current collector having holes penetrating from the surface to the rearface to constitute an organic electrolyte capacitor, it could be confirmed that lithium ions could be supplied simply and conveniently without re-assembling the cell by opposing one sheet of metal lithium to 8 sheets of negative electrodes and short-circuiting the same in this embodiment, which was also industrially effective.

Comparative Example 11

Comparative Example Using Positive Electrode 2 of Example 10 for Both Positive and Negative Electrodes (Charge/Discharge Characteristic Evaluation 4 for Organic Electrolyte Capacitor)

(Preparation of Cell)

The positive electrode 2 in Example 10 was used for a positive electrode and a negative electrode, cut in the shape as shown in FIG. 11 such that the electrode area was 5.0×8.0 cm² respectively, cellulose/rayon mixed non-woven fabric of 30 μm thickness was used as a separator, arranged such that the weld portion with the connection terminals of the positive electrode current collector and the negative electrode current collector (hereinafter referred to as "weld portion of connection terminal") were on opposite sides respectively, and they were laminated to a cell thickness of about 4 mm. The positive electrodes and the negative electrodes were each of 8 sheets. Separators were located to the uppermost portion and the lowermost portion and four sides were fixed with a tape to obtain an electrode lamination unit.

An aluminum positive electrode terminal of 10 mm width, 30 mm length, and 0.2 mm thickness in which a sealant film was preliminarily heat fused to a seal portion was stacked and welded by supersonic waves to a terminal weld portion (8 sheets) of the positive electrode current collector of the electrode lamination unit. In the same manner, a nickel negative electrode terminal of 10 mm width, 30 mm length, and 0.2 mm thickness in which a sealant film was heat fused preliminarily to a seal portion was welded by supersonic waves to the terminal weld portion (8 sheets) of the negative electrode current collector and placed inside the two sheets of exterior films deep drawn to 102 mm length, 52 mm width, and 2 mm depth (space for 4 mm in total). After heat-sealing the two sides and one other side of the terminal portions of the external laminate film and, after vacuum impregnating a solution formed by dissolving $TEABF_4$(Tetraetylammonium Tetrafluoroborate) to a concentration of 1 mol/l to a mixed solvent at propylene carbonate as the electrolyte, remaining one side was heat fused under a reduced pressure and applying vacuum sealing to assemble 2 cells of film type organic electrolyte capacitors (cell thickness: 4.3 mm).

(Characteristic Evaluation for Cell)

Constant current-constant voltage charging of charging the assembled two cells to a cell voltage of 2.5 V at a constant current of 1000 mA and then applying a constant voltage of 2.5 V was conducted for one hour. Then, discharging was conducted till the cell voltage lowered to 0 V with 100 mA of constant current. The 2.5 V-0 V cycle was repeated and the discharge capacity at the third cycle was 81 mAh as an average for the two cells.

The energy density when the cell was sized as 100 mm length and 50 mm width was 4.7 Wh/l. Even when an electric double layer capacitor was constructed by using the positive electrode 2 showing a high energy density in Example 10 for the positive electrode and the negative electrode to constitute a electric double layer capacitor, no such high energy density as in Example 10 could be obtained. That is, a high energy density as shown in Example 10 can not be obtained without using a mesopored carbon material having a pore volume of 0.10 ml/g or more for pore diameter 3 nm or larger for the negative electrode active material.

The invention claimed is:

1. An organic electrolyte capacitor comprising:
   a positive electrode,
   a negative electrode and
   an electrolyte capable of transporting lithium ions,
   wherein the negative electrode active material is a mesopored carbon material having a pore volume of 0.10 ml/g or more for pore diameter of 3 nm or larger; and
   wherein said lithium ions are preliminarily supported on the negative electrode and/or positive electrode so that the positive electrode potential is 2.0 V (Li/Li+) or lower, when the positive electrode and the negative electrode are short-circuited.

2. The organic electrolyte capacitor according to claim 1, wherein the mesopored carbon material is one or a mixture of a plurality of members selected from activated carbon, coconut shell coal, coke, charcoal, bamboo coal and resin carbide.

3. The organic electrolyte capacitor according to claim 2, wherein the resin carbide is a phenol resin carbide, or the resin carbide is a phenol resin.

4. The organic electrolyte capacitor according to claim 1, wherein the mesopored carbon material is produced by using Ni or Ni compound.

5. The organic electrolyte capacitor according claim 1, wherein the organic electrolyte capacitor includes a positive electrode current collector and a negative electrode current collector, each of the current collectors has holes penetrating from surface to rear face, and lithium ions are supported by being supplied from lithium opposed to the negative electrode and/or the positive electrode electrochemically to the negative electrode and/or the positive electrode.

6. The organic electrolyte capacitor according claim 5, wherein the porosity of the electrode current collector is from 10 to 79%.

7. The organic electrolyte capacitor according claim 5, wherein the porosity of the electrode current collector is from 20 to 60%.

8. The organic electrolyte capacitor according claim 1, wherein the mesopored carbon material has a pore volume of about from 0.10 to 0.5 ml/g for a pore diameter of 3 nm or larger.

9. The organic electrolyte capacitor according claim 1, wherein the mesopored carbon material has a pore volume of about from 0.15 to 0.5 ml/g for a pore diameter of 3 nm or larger.

10. The organic electrolyte capacitor according claim 1, wherein the positive electrode potential is 1.0 V (Li/Li+) or lower upon short-circuiting the positive electrode and the negative electrode.

* * * * *